United States Patent
Horiguchi

(10) Patent No.: US 6,941,059 B1
(45) Date of Patent: *Sep. 6, 2005

(54) INFORMATION PROCESSING METHOD, INFORMATION PROCESSING SYSTEM AND INFORMATION PROCESSOR

(75) Inventor: Mari Horiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/743,243

(22) PCT Filed: Apr. 28, 2000

(86) PCT No.: PCT/JP00/02841

§ 371 (c)(1),
(2), (4) Date: Apr. 9, 2001

(87) PCT Pub. No.: WO00/69121

PCT Pub. Date: Nov. 16, 2000

(30) Foreign Application Priority Data

May 7, 1999  (JP) .......................................... 11-127351

(51) Int. Cl.[7] ................................................ H04N 5/91
(52) U.S. Cl. ............................ 386/46; 386/95; 709/220
(58) Field of Search .......................... 386/46, 124, 95, 386/125, 126, 83; 709/220

(56) References Cited

U.S. PATENT DOCUMENTS

| | | | | | |
|---|---|---|---|---|---|
| 6,085,236 A | * | 7/2000 | Lea | ............................. | 709/220 |
| 6,389,496 B1 | * | 5/2002 | Matsuda | ..................... | 710/316 |
| 6,466,971 B1 | * | 10/2002 | Humpleman et al. | ....... | 709/220 |
| 6,683,999 B2 | * | 1/2004 | Ito et al. | ..................... | 382/305 |
| 2002/0057893 A1 | * | 5/2002 | Wood et al. | .................. | 386/46 |

FOREIGN PATENT DOCUMENTS

| | | |
|---|---|---|
| CN | 1196613 A | 10/1998 |
| CN | 1211127 A | 3/1999 |
| EP | 0 872 986 A2 | 10/1998 |
| JP | 10-210058 | 8/1998 |
| JP | 10-290238 | 10/1998 |
| JP | 11-27299 | 1/1999 |

OTHER PUBLICATIONS

Australian Official Journal of Patents, Oct. 22, 1998, Australian Patent No. 60789/98 dated Apr. 14, 1998 (Abstract only).

* cited by examiner

*Primary Examiner*—Vincent Boccio
(74) *Attorney, Agent, or Firm*—Frommer Lawrence & Haug LLP; William S. Frommer

(57) ABSTRACT

When information is transmitted among a plurality of devices connected through a network, an information opening data storage section for opening predetermined information is set to devices connected through the network, the information opening data storage section is formed in a descriptor format having a predetermined hierarchical structure, predetermined information is stored in a board 910 set in the descriptor format, the position at which the predetermined board 900 is stored is directly instructed by the highest-order descriptor 900 having the hierarchical structure, and information concerning a predetermined information is stored in information areas 921, 922, 931, 932 instructed when the hierarchical structure is retrieved from the highest-order descriptor 900.

12 Claims, 26 Drawing Sheets

FIG. 7

| Offset | Name | Operation |
|---|---|---|
| 000h | State Clear | State and Control Information |
| 004h | State Set | Set State Clear Bit |
| 008h | Node ID | Show Node ID of 16 Bits |
| 00Ch | Reset Start | Start Command Reset |
| 018-01Ch | Split Time Out | Prescribe Maximum Time of Split |
| 200h | Cycle Time | Cycle Time |
| 210h | Busy Time Out | Prescribe Limit of Retry |
| 21Ch | Bus Manager | Show ID of Bus Manager |
| 220h | Band Available Situation | Show Band Which can be Allocated to Isochronous Communication |
| 224h-228h | Channel Available Situation | Show Available Situation Of Each Channel |

FIG. 8

| | |
|---|---|
| 900h | Output Master Plug Register |
| 904h | Output Plug Control Register #0 |
| 908h | Output Plug Control Register #1 |
| ⋮ | ⋮ |
| 97Ch | Output Plug Control Register #30 |
| 980h | Intput Master Plug Register |
| 984h | Intput Plug Control Register #0 |
| 988h | Intput Plug Control Register #1 |
| ⋮ | ⋮ |
| 9FCh | Intput Plug Control Register #30 |

FIG. 9A oMPR

| Data Rate Capability | Broadcast Channel Base | Auxiliary Extended Field | Main Extended Field | (Reserved) | Number of Output Plug |
|---|---|---|---|---|---|
| 2 | 6 | 8 | 8 | 3 | 5 (Bits) |

FIG. 9B oPCR [n]

| On-Line | Broadcast Connection Counter Value | P-P Connection Counter Value | (Reserved) | Number of Channel | Data Rate | Overhead ID | Payload |
|---|---|---|---|---|---|---|---|
| 1 | 6 | 6 | 2 | 6 | 2 | 4 | 10 (Bits) |

FIG. 9C iMPR

| Data Rate Capability | (Reserved) | Auxiliary Extended Field | Main Extended Field | (Reserved) | Number of Input Plug |
|---|---|---|---|---|---|
| 2 | 6 | 8 | 8 | 3 | 5 (Bits) |

FIG. 9D oPCR [n]

| On-Line | Broadcast Connection Counter Value | P-P Connection Counter Value | (Reserved) | Number of Channel | (Reserved) |
|---|---|---|---|---|---|
| 1 | 6 | 6 | 2 | 6 | 16 (Bits) |

FIG. 12

| address | General Subunit Descriptor | |
|---|---|---|
| | Contents | |
| 00 00$_{16}$ | Descriptor Length | |
| 00 01$_{16}$ | | |
| 00 02$_{16}$ | Generation ID | |
| 00 03$_{16}$ | Size of Object ID | |
| 00 04$_{16}$ | Size of Object ID | |
| 00 05$_{16}$ | Size of Object Position | |
| 00 06$_{16}$ | Number (n) of Root Object List | |
| 00 07$_{16}$ | | |
| 00 08$_{16}$ ⋮ | Root Object List ID 0 | |
| ⋮ | ⋮ | |
| ⋮ | Root Object List ID n-1 | |
| ⋮ | Subunit Dependent Data Length | |
| ⋮ | Subunit Dependent Guide | |
| ⋮ | Vender Unique Data Length | |
| ⋮ | Vender Unique Guide | |

FIG. 13

| Allocation of Generation ID Value ||
|---|---|
| Generation ID | Meaning |
| $00_{16}$ | AV/C General Version 3.0 Standard |
| Other Values | Reserved |

FIG. 14

| Allocation of List ID Value ||
|---|---|
| Value | List |
| $0000_{16}$ $0FFF_{16}$ | Reserved |
| $1000_{16}$ $3FFF_{16}$ | Subunit Type Unique Value |
| $4000_{16}$ $FFFF_{16}$ | Reserved |
| 1 $000_{16}$ | Subunit Type Unique Value |

Stack Model

Command and Response of FCP

FIG. 19

| Command Type/Response | | |
|---|---|---|
| Command | 0000 | Control |
| | 0001 | Status |
| | 0010 | Specific Inquiry |
| | 0011 | Notify |
| | 0100 | General Inquiry |
| | 0101 ~ 0111 | (reserved) |
| Response | 1000 | Not Implemented |
| | 1001 | Accepted |
| | 1010 | Rejected |
| | 1011 | In Transition |
| | 1100 | Implemented |
| | 1101 | Changed |
| | 1110 | (reserved) |
| | 1111 | Interim |

| Subunit Type | |
|---|---|
| 00000 ~ 00011 | Video Monitor |
| 00100 | Disc Recorder/Player |
| | Tape Recorder/Player |
| 00101 | Tuner |
| 00111 | Video Camera |
| 01010 | BBS |
| 11100 | |
| 11101 | Vender Unique Value |
| 11110 | (Specific Subunit Type) |
| 11111 | Unit |

| Opcode : Operation Code | |
|---|---|
| 00h | Vender Unique Value |
| 50h | Search Mode |
| 51h | Time Code |
| 52h | ATN |
| 60h | Memory Open |
| 61h | Memory Read |
| 62h | Memory Write |
| C1h | Load |
| C2h | Record |
| C3h | Playback |
| C4h | Rewind |
| ~ | ~ |

FIG. 20A

| AV/C | Control | Tape Recorder/Player | In The Case of ID0 | Playback | Forward Direction |
|---|---|---|---|---|---|
| CTS= 0000 | C Type= 0000 | SubunitType= 00100 | id=000 | Opecode=C3h | Operand=75h |

FIG. 20B

| AV/C | Accepted | Tape Recorder/Player | In The Case of ID0 | Playback | Forward Direction |
|---|---|---|---|---|---|
| CTS= 0000 | Response= 1001 | SubunitType= 00100 | id=000 | Opecode=C3h | Operand=75h |

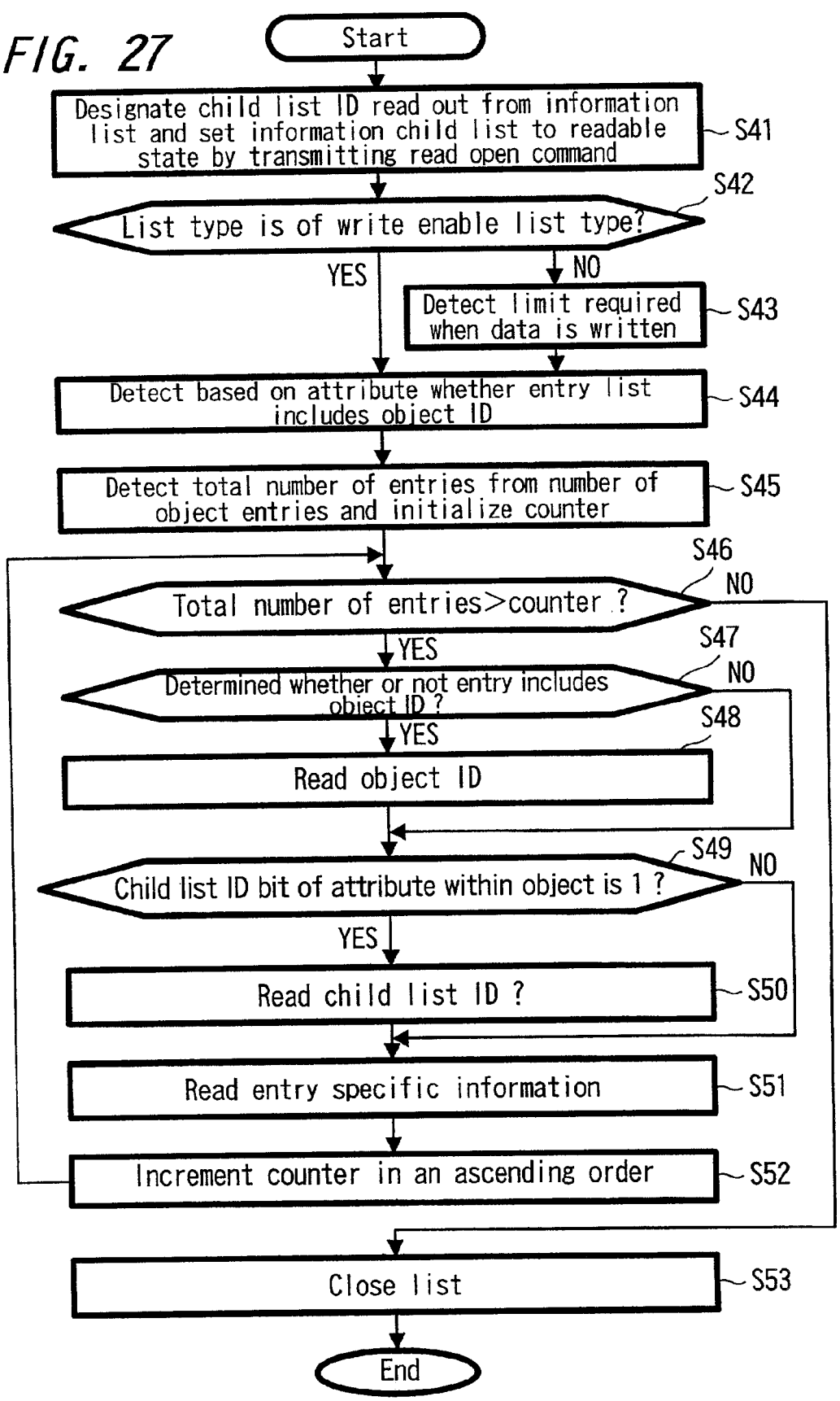

FIG. 28

| Value | List Type Name | Contents |
|---|---|---|
| $00_{16} \sim 7F_{16}$ | — | Reserved |
| $80_{16}$ | Read-Only Board List | Data Cannot be Written From External Controller |
| $81_{16}$ | Write Enable Board List | Data Can be Written From internal and External Controllers |
| $82_{16}$ | Read-Only Information List | Data Cannot be Written From External Controller |
| $83_{16}$ | Write Enable Information List | Data Can be Written From internal and External Controller |
| $84_{16} \sim FF_{16}$ | — | Reserved |

FIG. 29

| Opecode | Open Descriptor |
|---|---|
| Operand 0 | Descriptor Type |
| Operand 1 | List ID |
| Operand 2 | List ID |
| Operand 3 | Subfunction (Write Open) |
| Operand 4 | Reserved |

FIG. 30

| Opecode | Read Descriptor |
|---|---|
| Operand 0 | Descriptor Identifier |
| Operand 1 | : |
| : | : |
| : | Read Result Status |
| : | Reserved |
| : | Data Length |
| : | Address |

FIG. 31

| Opecode | Write Descriptor |
|---|---|
| Operand 0 | Descriptor Identifier |
| : | Subfunction |
| : | Group Tag |
| : | Write Data Length |
| : | Address |
| : | Original Data Length |
| : | Data Written |

FIG. 32

| Opecode | Open Descriptor |
|---|---|
| Operand 0 | Descriptor Type |
| Operand 1 | List ID |
| Operand 2 | List ID |
| Operand 3 | Subfunction (Close) |
| Operand 4 | Reserved |

INFORMATION PROCESSING METHOD, INFORMATION PROCESSING SYSTEM AND INFORMATION PROCESSOR

TECHNICAL FIELD

The present invention relates to an information processing method, an information processing system and an information processing apparatus for use with electronic devices such as AV devices connected to a network, for example, so that they can be controlled by a remote-controller. More particularly, this invention relates to an information processing method, an information processing system and an information processing apparatus suitably applied to the case in which devices can share information within the device by using a control command such as a so-called AV/C command, for example.

BACKGROUND ART

Heretofore, there have been developed AV devices which are capable of transmitting information with each other through a network using an IEEE 1394 serial data bus prescribed by the IEEE (The Institute of Electrical and Electronics Engineers), for example. In this network, a user is able to control the AV devices connected to the above network with each other by using a predetermined command (AV/C Command Transaction Set: hereinafter abbreviated as an "AV/C command"). The details of the IEEE 1394 system and the details of the AV/C command are described in the AV/C Digital Interface Command Set General Specification which is laid open in the 1394 Trade Association.

As shown in FIG. 1, when an IEEE 1394 serial data bus 51 (hereinafter referred to as a "bus 51") is used, video data received by an IRD (Integrated Receiver Decoder) 52, which is a digital satellite receiver for receiving and decoding a digital satellite broadcasting, for example, can be recorded by a DVCR (Digital Video Cassette Recorder) 53 connected to the integrated receiver decoder via the bus 51. Further, video data can be recorded by these IRD 52 and DVCR 53 in a so-called timer-activated recording fashion under control of the AV/C command.

When video data is recorded by this apparatus in a timer-activated recording mode, the IRD 52 and the DVCR 53 are controlled by a controller 54 provided within the IRD 52, for example. In this case, the setting (channel, start time, etc.) of the timer-activated recording is effected on the IRD 52. At the set start time, the controller 54 outputs a command to a digital tuner 55 provided within the IRD 52 so that the digital tuner may select the set channel and that a video signal or the like received by the digital tuner 85 from signals received at an antenna 56 is output to the bus 81.

At the same time, a recording start command is transmitted from the controller 54 through the bus 51 to a recorder 57 provided within the DVCR 53. Consequently, the recorder 57 obtains the video signal or the like selected and received at the digital tuner 55 from the bus 51 and records the same on a recording medium such as a magnetic tape. The timer-activated recording is made in this manner. Further, the DVCR 53 also includes a controller 58 to effect a control such as recording a video signal or the like received at an analog tuner 59 incorporated therein by the recorder 57.

When the AV/C command, which controls the devices connected to the network by the remote controller, shares information within the devices with other devices as described above, it has been customary that information is shared by setting lists to the control target subunit such as a VCR subunit and a tuner subunit. However, according to the above method, the contents of the shared information are limited to those relating to the respective subunits. In accordance with the development of the future network system, there is a possibility that the contents of shared information will not be limited to those unique to the subunits but a demand of handling information of various contents will increase.

On the other hand, the assignee of the present application has previously proposed an AV/C Bulletin Board Subunit (AV/C Bulletin Board Subunit: hereinafter abbreviated as a "BBS") as a space for sharing information independent of subunits (see the 1394 Trade Association Board Subunit General Specification, Rev. 0.38). According to this system, the BBS can share arbitrary information thereby to control arbitrary devices with each other.

However, in the previously-proposed BBS, a method required when boards of a plurality of types should coexist and a list structure required when a plurality of boards of the same type should exist are not definite, and hence a variety of data cannot be stored efficiently. Accordingly, when data is read out from another device or data is written in another device, data should be processed after all data had been read out from the BBS, for example, with the result that processing becomes complicated. Therefore, there is an increasing demand of efficiently writing and reading data by using the BBS.

DISCLOSURE OF INVENTION

In view of the aforesaid aspect, it is an object of the present invention to provide an information processing method, an information processing system and an information processing apparatus in which satisfactory information processing, which cannot be made by a conventional information processing method, a conventional information processing system and a conventional information processing apparatus, can be executed by using a BBS.

According to the first invention, there is provided an information processing method of transmitting information among a plurality of devices connected through a network which is comprised of the steps of setting an information opening data storage section for opening predetermined information to devices connected through the above network, forming the above information opening data storage section in a descriptor format having a predetermined hierarchical structure, storing the above predetermined information in a board set in the above descriptor format, directly instructing the position at which the above predetermined information is stored in the predetermined board by a highest-order descriptor of the above hierarchical structure and storing information concerning the above predetermined information in an information area instructed when the above hierarchical structure is retrieved from the above highest-order descriptor. With this arrangement, another device connected through the network can easily understand the position at which the predetermined information opened through the network is stored, and hence such information can easily be read out from the position at which it is stored. Moreover, another device can easily understand the position at which information concerning the predetermined information is stored.

According to the second invention, in the information processing method according to the first invention, the information area includes an area in which information from other devices than the device in which the descriptor is set can be written and an area in which the writing of information from other devices is limited. With this arrangement, only necessary information can properly be protected from the writing of information from other devices.

According to the third invention, in the information processing method according to the second invention, when the above information write enable area is set, information concerning a capacity in which information can be written is added to the descriptor. With this arrangement, other devices can judge a capacity in which information can be written, and hence the writing of information can satisfactorily be executed within a prepared area.

According to the fourth invention, in the information processing method according to the first invention, information stored in the board and information stored in the information area can be associated with each other by adding IDs to respective information stored in the above predetermined board and by adding a common ID to respective information stored in the above information area. With this arrangement, a user can easily understand a correspondence between the information stored in the board and the information stored in the information area with reference to the IDs.

According to the fifth invention, there is provided an information processing system for transmitting information among a plurality of devices connected through a network which is comprised of a first device connected to the above network, the first device including an information opening data storage section for opening predetermined information to devices connected through the above network and a control section for reading data or writing data stored in the above information opening data storage section by receiving a predetermined command through the above network and a second device connected to the above network including a control section for issuing a command which instructs the reading of data or the writing of data stored in the above information opening data storage section, in which data is stored in the information opening data storage section provided in the above first device in a descriptor format having a predetermined hierarchical structure, the above predetermined information is stored in a board set in the descriptor format, the position at which the predetermined information is stored in the above predetermined board is directly instructed by the highest-order descriptor having the hierarchical structure, and information concerning the above predetermined information is stored in an information area instructed when the above hierarchical structure is retrieved from the above highest-order descriptor. With this arrangement, the second device connected through the network can easily understand the position at which the predetermined information opened through the network is stored, and hence there is obtained the system in which the information can easily be read out from the first device. Moreover, the system can easily understand the position at which the information concerning the predetermined information is stored.

According to the sixth invention, in the information processing system according to the fifth invention, an area in which information from the second device can be written and an area in which the writing of information from the second device is limited are set to the information area within the information opening data storage section of the first device. With this arrangement, a write protection from the second device can properly be effected only on necessary information.

According to the seventh invention, in the information processing system according to the sixth invention, when an information write enable area is set as the above information area, a storage area of information concerning a capacity in which information can be written is added to a descriptor and the control section in the second device judges a capacity in which information can be written. With this arrangement, there is provided a system in which the second device can judge the capacity in which information can be written and in which the writing of information can satisfactorily be executed within a prepared area.

According to the eighth invention, in the information processing system according to the fifth invention, IDs are added to respective information stored in the predetermined board within the information opening data storage section of the above first device, a common ID is added to respective information stored in the above information area and the control section in the above second device can judge based on the IDs a correspondence between the information stored in the above board and the information stored in the above information area. With this arrangement, the second device side can easily understand based on the IDs a correspondence between the information stored in the board and the information stored in the information area.

According to the ninth invention, there is provided an information processing apparatus for transmitting information to another device connected through the network, which is comprised of an information opening data storage section for opening predetermined information to another device connected through the above network and a control section for reading or writing data stored in the above information opening data storage section by receiving a predetermined command through the above network, wherein data is stored in the above information opening data storage section in the descriptor format having the hierarchical structure, the above predetermined information is stored in a board set in the above descriptor format, the position at which the predetermined information is stored in the above predetermined board is directly instructed by the highest-order descriptor of the above hierarchical structure and information concerning the above predetermined information is stored in an information area instructed when the above hierarchical structure is retrieved from the above highest-order descriptor. With this arrangement, another device connected through the network can easily understand the position at which the predetermined information opened through the network is stored, and hence such information can easily be read out. Another device side which communicates with this apparatus can easily understand the position at which information concerning the predetermined information is stored.

According to the tenth invention, in the information processing apparatus according to the ninth invention, an area in which information from other devices can be written and an area in which the writing of information from other devices is limited are set to the information area within the above information opening data storage section. With this arrangement, a write protection from another device connected through the network can properly be effected only on necessary information.

According to the eleventh invention, in the information processing apparatus according to the tenth invention, when an information write enable area is set as the above information area, a storage area of information concerning a capacity in which information can be written is added to a descriptor. With this arrangement, another device connected through the network can judge the capacity in which information can be written, and hence the writing of information can satisfactorily be executed within a prepared area.

According to the twelfth invention, in the information processing apparatus according to the ninth invention, IDs are added to respective information stored in a predetermined board within the above information opening data storage section and a common ID is added to respective information stored in the above information area. With this arrangement, another device side connected through the network can easily understand based on the IDs a correspondence between information stored in the board and information stored in the information area.

BRIEF DESCRIPTION OF DRAWINGS

FIG. 7 is an explanatory diagram showing examples of positions, names and operations of major CRS.

FIG. 8 is an explanatory diagram showing an example of an arrangement of a plug control register.

FIG. 9 is an explanatory diagram showing examples of arrangements of oMPR, oPCR, iMPR, iPCR.

FIG. 12 is an explanatory diagram showing an example of a data structure of a descriptor.

FIG. 13 is an explanatory diagram showing an example of a generation ID shown in FIG. 12.

FIG. 14 is an explanatory diagram showing an example of a list ID shown in FIG. 12.

FIG. 19 is an explanatory diagram showing concrete examples of AV/C command.

FIG. 20 is an explanatory diagram showing concrete examples of commands and response of the AC/C command.

FIG. 27 is a flowchart showing an example of processing executed when an information child list is read out.

FIG. 28 is an explanatory diagram showing examples of list types.

FIG. 29 is an explanatory diagram showing an example of a data arrangement of an open command.

FIG. 30 is an explanatory diagram showing an example of a data arrangement of a read command.

FIG. 31 is an explanatory diagram showing an example of a data arrangement of a write command.

FIG. 32 is an explanatory diagram showing an example of a data arrangement of a close command.

BEST MODE FOR CARRYING OUT THE INVENTION

An embodiment according to the present invention will be described below with reference to FIGS. 2 to 32.

Figure 1:
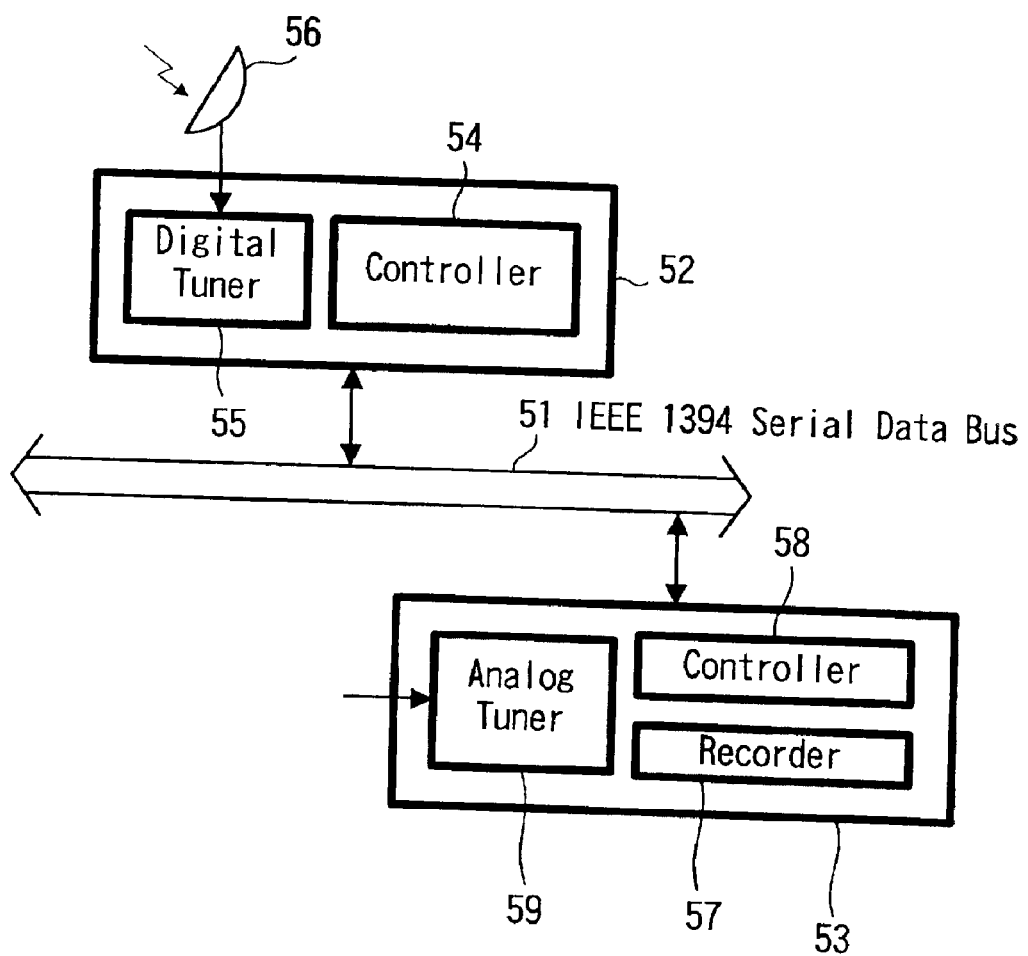
FIG. 1 is a diagram showing an arrangement of a conventional network apparatus.
Figure 2:
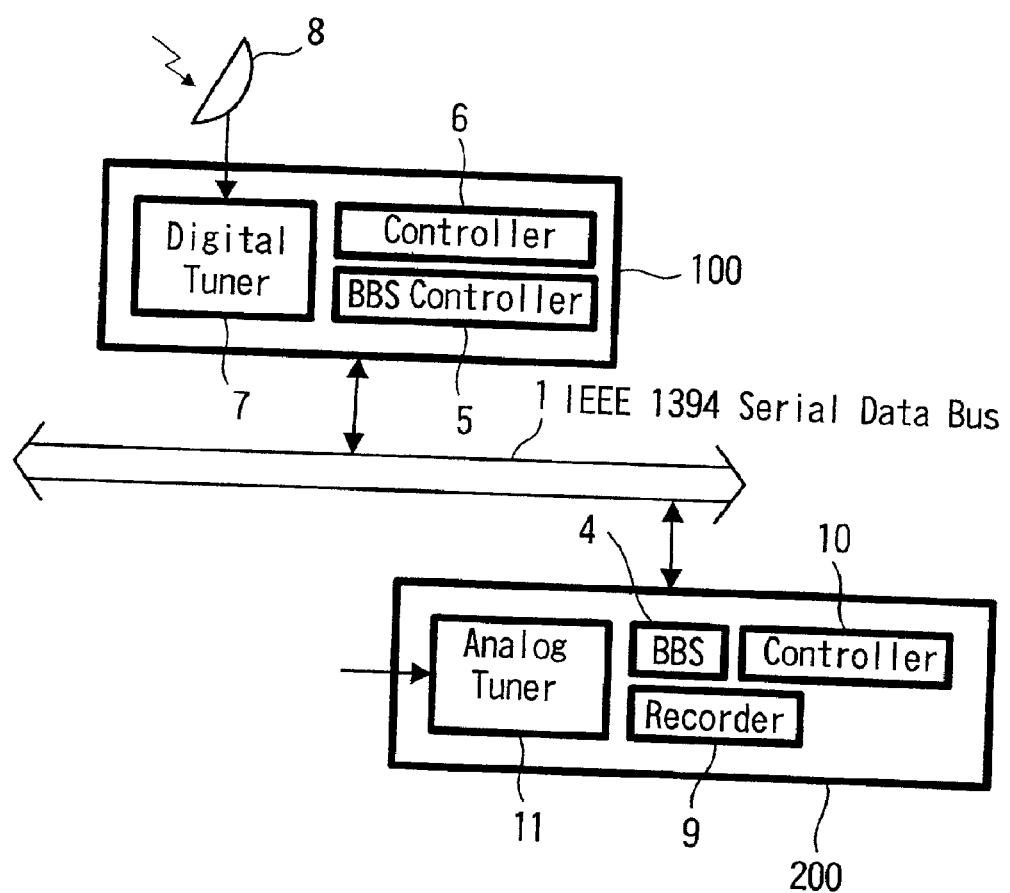
FIG. 2 is a diagram showing an arrangement of a network apparatus according to an embodiment of the present invention.

First, an example of an overall arrangement of an audio-visual system according to this embodiment will be described with reference to FIG. 2. Specifically, as shown in FIG. 2, for example, an IRD 100 which is a digital satellite receiver for receiving and decoding a digital satellite broadcasting and a DVCR 200 which is a digital video recording and reproducing apparatus are connected to a bus line 1 prescribed by the IEEE 1394, for example. Although not shown, other devices may also be connected to the bus line 1.

The DVCR 200 includes a BBS (bulletin board subunit) 4 which functions as a bulletin board for opening information to other devices. This BBS 4 is set by storing corresponding data in a part of an area of a memory connected to a controller 10 within the DVCR 200, for example. Data can be written in and read out from the BBS 4 under control of the controller 10 within the DVCR 200. The IRD 100 includes a BBS controller 5 for reading and writing the BBS on the DVCR 200 side. When data is read and written under control of the IRD 100, there is used an AV/C descriptor mechanism prescribed by the AV/C command, for example. The details of the AV/C command will be described later on.

When a timer-activated recording, for example, is executed, the IRD 100 and the DVCR 200 are controlled by the BBS controller 5 in the IRD 100, for example. Accordingly, the setting (channel, start time, end time, etc.) of the timer-activated recording is effected on the BBS controller 5 through the controller 6 of the IRD 100.

At the set start time, the BBS controller 5 outputs a command to a digital tuner 7 to select the set channel so that a video signal or the like selected and received from signals captured at an antenna 8 by the digital tuner 7 is outputted to the bus 1.

Simultaneously, a recording start command is transmitted from the BBS controller 5 through the bus 1 to the BBS 4 within the DVCR 200. Consequently, a command is outputted from the BBS 4 within the DVCR 200 to a recorder 9 and a video signal or the like channel-selected and received by the digital tuner 7 is obtained from the bus 1, thereby being recorded on a recording medium such as a magnetic tape. The timer-activated recording is made in this manner. Further, the DVCR 200 also includes a controller 10 to control such operation as to record the video signal or the like received at the incorporated analog tuner 11, for example, by the recorder 9. While the BBS controller 5 and the controller 6 are formed independently as shown in FIG. 2, in actual practice, a part of a CPU comprising the controller 6, for example, is set so as to function as the BBS controller 5.

Figure 3:
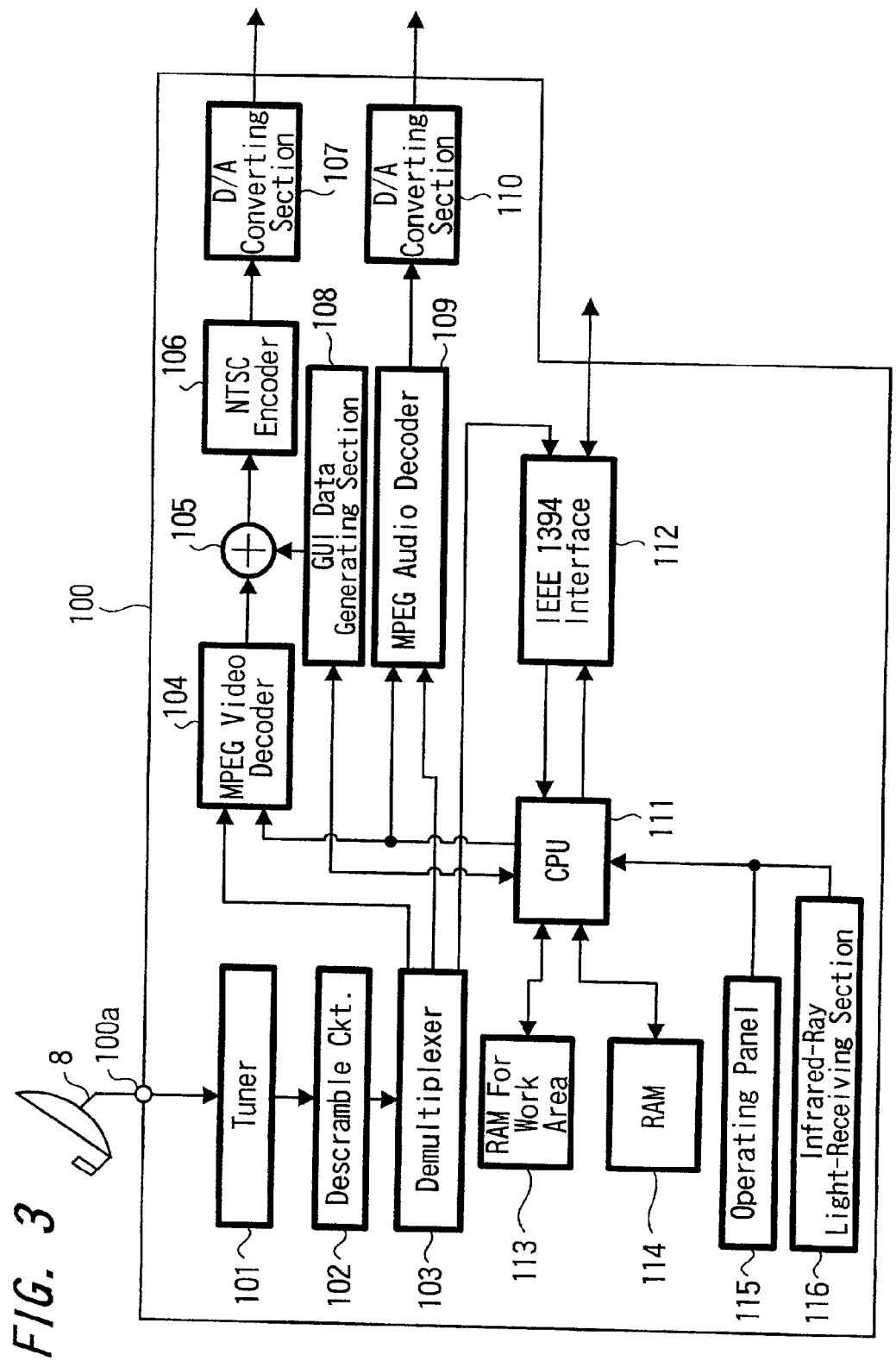
FIG. 3 is a block diagram showing an example of an arrangement of a digital satellite receiver.

FIG. 3 is a diagram showing an arrangement of the IRD 100. Broadcast waves from a satellite are received at the antenna 8, inputted to a terminal 100a and supplied to a tuner 101 serving as a program selecting means provided within the IRD 100. The IRD 100 is arranged such that its respective circuits are operated under control of a central processing unit (CPU) 111. A signal of a predetermined channel is obtained from the tuner 101. The received signal obtained by the tuner 101 is supplied to a descramble circuit 102.

Based on encrypted key information of a subscribed channel stored in an IC card (not shown) inserted into the body of the IRD 100, the descramble circuit 102 extracts only multiplexed data of a subscribed channel (or channel which is not yet encrypted) from received data and supplies the multiplexed data thus extracted to a demultiplexer 103.

The demultiplexer 103 rearranges the multiplexed data supplied thereto at every channel, extracts only data of the channel designated by a user, transmits a video stream comprising packets of video portion to an MPEG video decoder 104 and also transmits an overlap stream comprising packets of audio portion to an MPEG audio decoder 109.

The MPEG decoder 104 decodes the video stream to restore video data which is not yet compression-coded and transmits such video data through an adder 105 to an NTSC encoder 106. The NTSC encoder 106 encodes the video data to provide NTSC system luminance signal and color difference signals and transmits the same to a digital-to-analog converter 107 as NTSC system video data. The digital-to-analog converter 107 converts the NTSC data into an analog video signal and supplies the analog video signal to a connected receiver (not shown).

The IRD 100 according to this embodiment includes a GUI data generating section 108 which generates various kinds of display video data for a graphical user interface (GUI) under control of the CPU 111. The GUI video data (display data) generated by this GUI data generating section 108 is supplied to the adder 105, in which it is superimposed upon the video data outputted from the MPEG video decoder 104 and thereby a GUI picture is superimposed upon a broadcast picture.

The MPEG audio decoder 109 decodes an audio stream to restore PCM audio data which is not yet compression-coded and transmits the same to a digital-to-analog converter 110.

The digital-to-analog converter 110 converts the PCM audio data into an analog signal to provide a left channel audio signal and a right channel audio signal, and outputs the same through speakers (not shown) of a connected audio reproducing system as sounds.

The IRD 100 according to this embodiment can supply the video stream and the audio stream extracted by the demultiplexer 103 to an IEEE 1394 interface section 112 from which they can be transmitted to the IEEE 1394 system bus line 1 connected to the interface section 112. The received video stream and audio stream are transmitted in the isochronous transfer mode. Further, while the GUI video data is being generated by the GUI data generating section 108, the above video data is supplied through the CPU 111 to the interface section 112 so that the GUI video data can be transmitted from the interface section 112 to the bus line 1.

A RAM 113 for work area and a RAM 114 are connected to the CPU 111, and control processing is executed by using these memories. Operation commands from an operating panel 115 and a remote control signal from an infrared-ray light-receiving section 116 are supplied to the CPU 111 which can therefore be driven based on a variety of operation. The CPU 111 can judge commands and responses transmitted from the bus line 1 side to the interface section 112.

Figure 4:
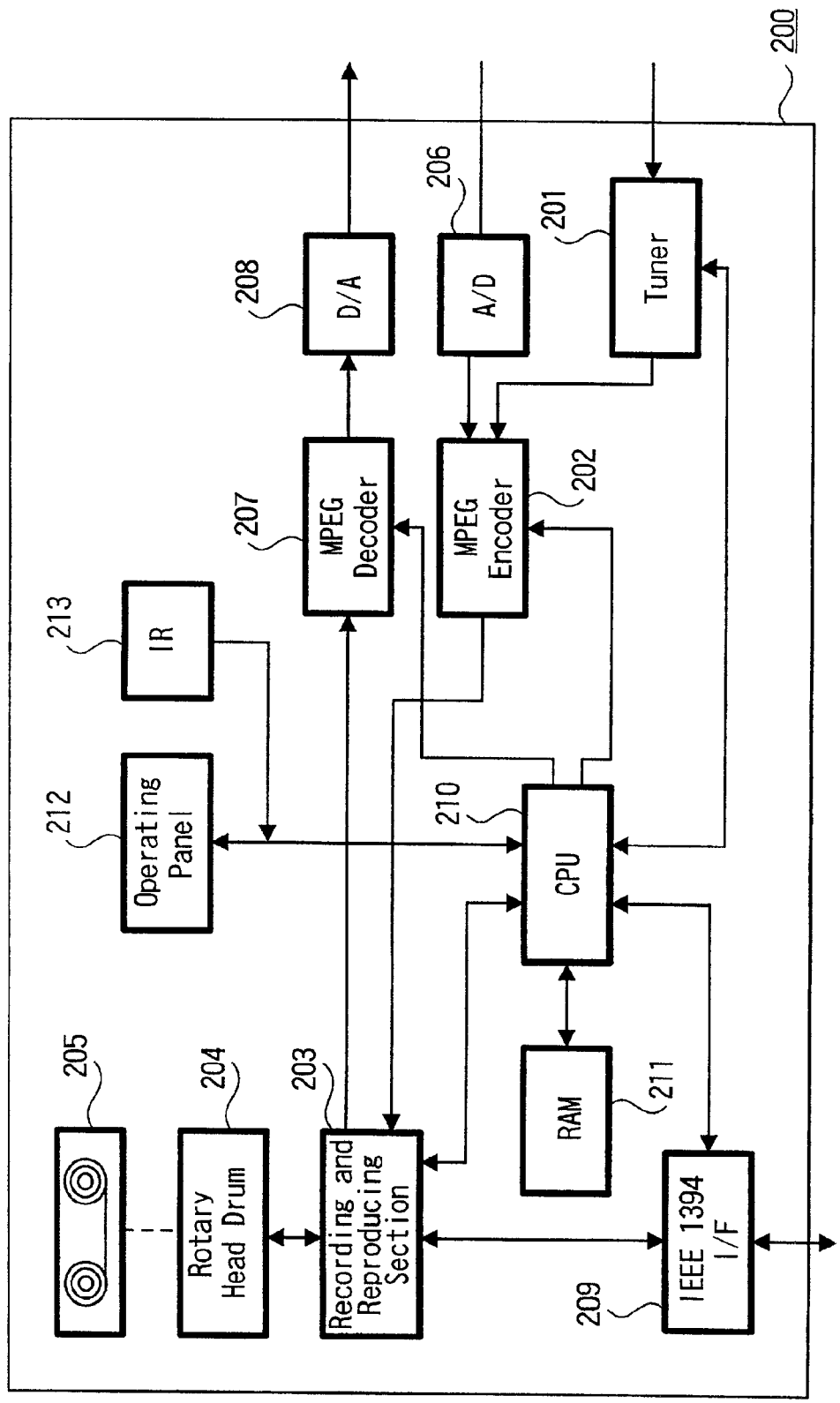
FIG. 4 is a block diagram showing an example of an arrangement of a video recording and reproducing apparatus.

FIG. 4 is a block diagram showing an example of an arrangement of the DVCR 200.

In the arrangement of the recording system, digital broadcasting data obtained when a tuner 201 incorporated in the DVCR 200 received data of a predetermined channel is supplied to an MPEG (Moving Picture Experts Group) encoder 202, in which it is encoded to provide video data and audio data suitable for recording, e.g., MPEG2 system video data and audio data. If received broadcasting data is MPEG2 system data, then such received broadcasting data need not be processed by the encoder 202.

The data encoded by the MPEG encoder 202 is supplied to a recording and reproducing section 203, in which it is processed for recording. The recording data thus processed is supplied to a recording head provided within a rotary head drum 204 and thereby recorded on a magnetic tape provided within a tape cassette 205.

After an analog video signal and an analog audio signal inputted from the outside had been converted into digital data by an analog-to-digital converter 206, they are supplied to the MPEG encoder 202, in which they are encoded to provide MPEG2 system video data and audio data and supplied to the recording and reproducing section 203 and thereby processed for recording. The recording data thus processed is supplied to the recording head provided within the rotary head drum 204 and thereby recorded on a magnetic tape provided within the tape cassette 205.

In the arrangement of the reproducing system, a signal obtained when the magnetic tape within the tape cassette 205 is reproduced by the rotary head drum 204 is supplied to the recording and reproducing section 203, in which it is processed for reproduction to provide video data and audio data. The video data and the audio data are supplied to an MPEG decoder 207, in which they are decoded from MPEG system video data and audio data, for example. The decoded data are supplied to a digital-to-analog converter 208, in which they are converted into an analog video signal and an analog audio signal and then outputted to the outside.

The DVCR 200 includes an interface section 209 for the connection to the IEEE 1394 system bus. Video data and audio data obtained at this interface section 209 from the IEEE 1394 system bus side are supplied to the recording and reproducing section 203 and thereby recorded on the magnetic tape provided within the tape cassette 205. Video data and audio data reproduced from the magnetic tape provided within the tape cassette 205 are supplied from the recording and reproducing section 203 to the interface section 209 from which they can be transmitted to the IEEE 1394 system bus side.

When video data and audio data are transmitted through the interface section 209, if the system in which video data and audio data are recorded on a medium (magnetic tape) by the DVCR 200 and the system of data transmitted over the IEEE 1394 system bus differ from each other, then the system may be converted by circuits provided within the DVCR 200.

The recording processing and the reproducing processing by the DVCR 200 and the transmission processing through the interface section 209 are executed under control of the central processing unit (CPU) 210. The memory 211 which is the RAM for work area is connected to the CPU 210. Operation information from an operating panel 212 and control information received by an infrared-ray light-receiving section 213 from the remote control apparatus are supplied to the CPU 210 which can control operation corresponding to the operation information and the control information. Further, when the interface section 209 receives control data such as an AV/C command, which is deccribed later, through the IEEE 1394 system bus, the above data is supplied to the CPU 210, and hence the CPU 210 can control corresponding operation.

Next, the manner in which data is transmitted through the IEEE 1394 system bus 1 to which the respective devices 100, 200 are connected will be described.

Figure 5:
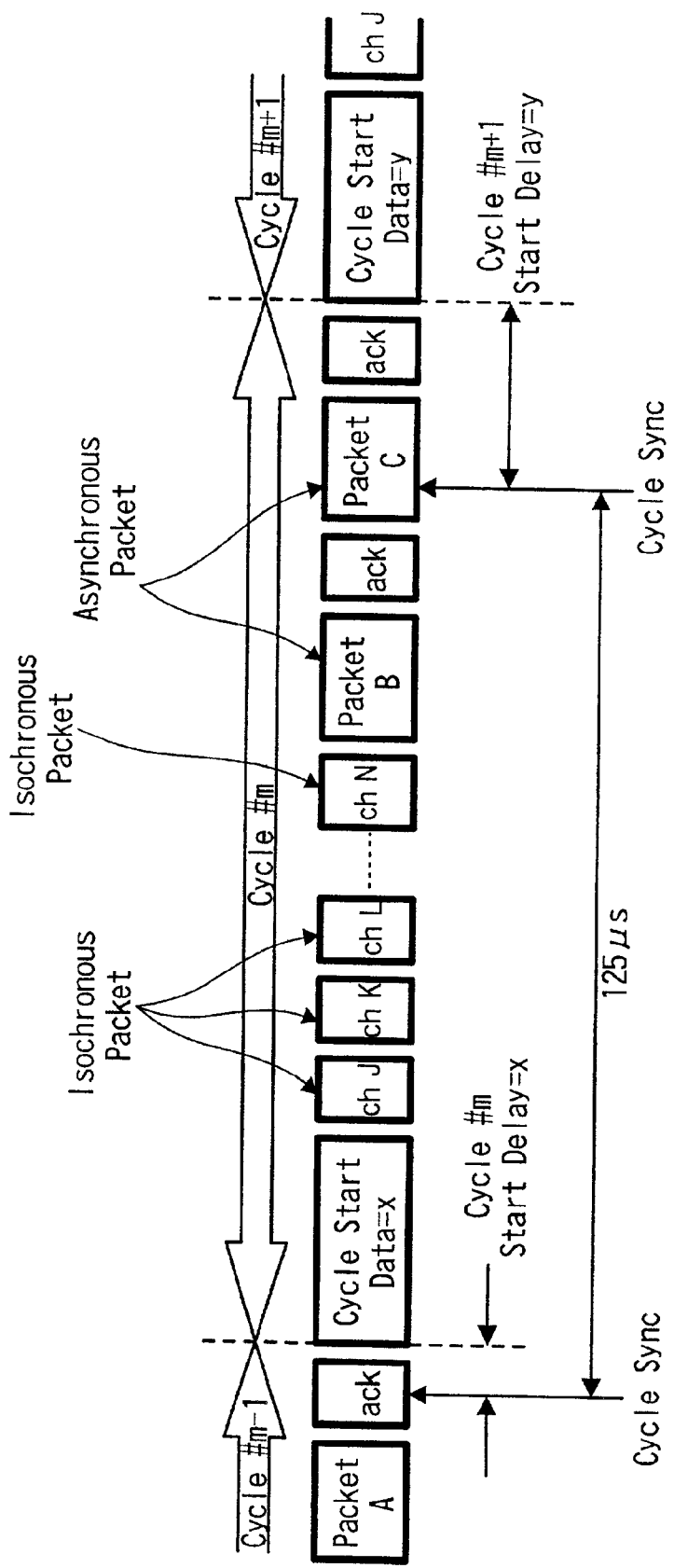
FIG. 5 is an explanatory diagram showing an example of an IEEE 1394 system frame structure.

FIG. 5 is a diagram showing a data transmission cycle structure of a device connected via the IEEE 1394. According to the IEEE 1394, data is divided into packets and transmitted in a time-division manner based on a cycle of a duration of 125 (S. This cycle is created by a cycle start signal supplied from a node having a cycle master function (any device connected to the bus). An isochronous packet secures a band necessary for transmission (referred to as a "band" although it is a time unit) from the start of all cycles. Accordingly, in the isochronous transmission, the transmission of data within a constant time can be assured. However, if a transmission error occurs, then data will be lost because this data transmission cycle structure has no mechanism for protecting data from the transmission error. In the asynchronous transmission in which a node, which secures a bus as a result of arbitration in a time which is not used in the isochronous transmission of each cycle, transmits the asynchronous packet, although a reliable transmission is assured by using acknowledge and retry, a transmission timing cannot be made constant.

When a predetermined node transfers data in the isochronous transfer mode, such node has to be corresponding to the isochronous function. At least one of the nodes corresponding to the isochronous function has to have a cycle master function. Further, at least one of the nodes connected to the IEEE 1394 serial bus has to have an isochronous resource manager function.

Figure 6:
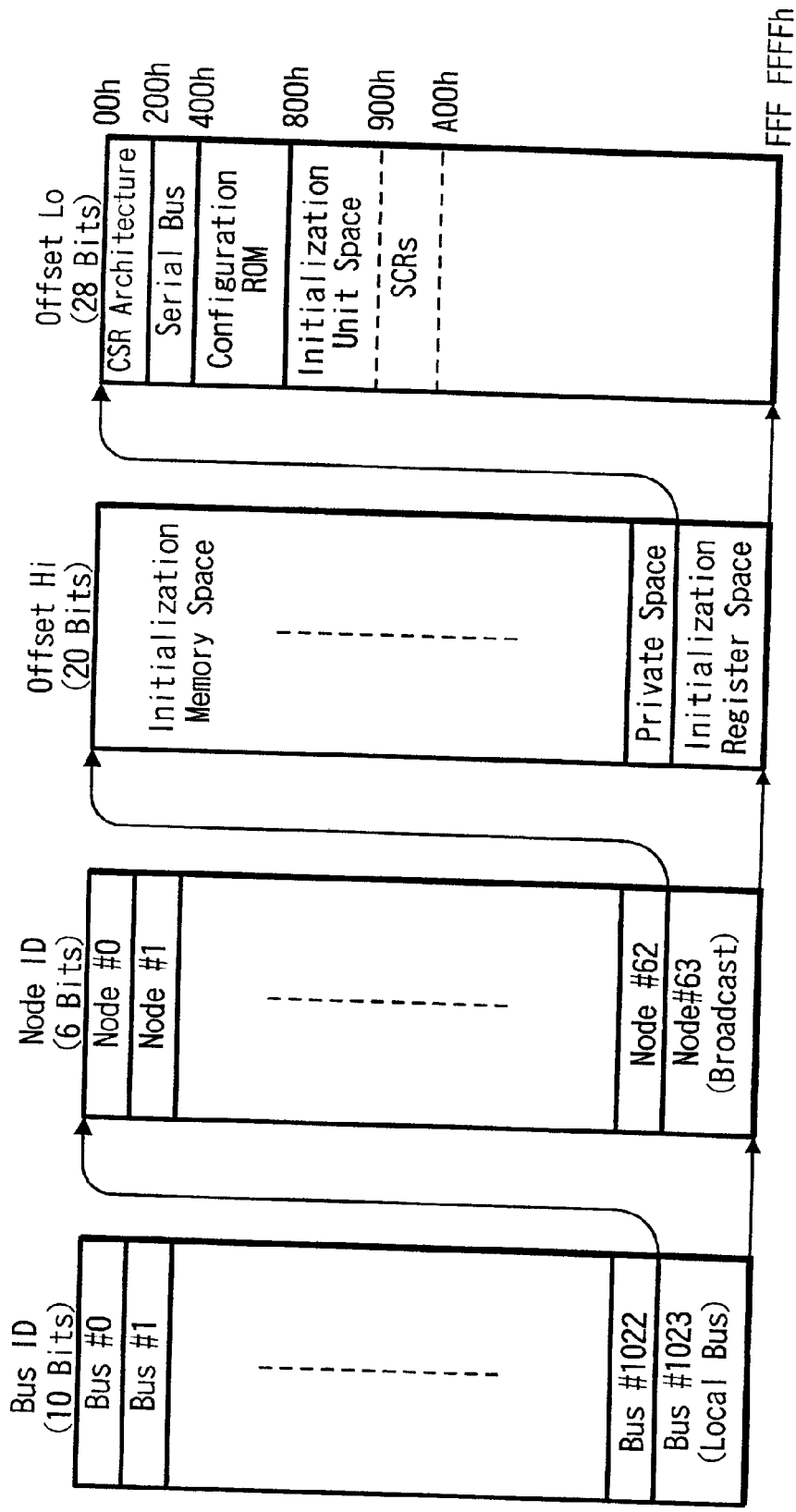
FIG. 6 is an explanatory diagram showing an example of an address space structure of a CRS architecture.

The IEEE 1394 is based on a CSR (Control & Status Register) architecture having 64-bit address space prescribed by the ISO/IEC 13213. FIG. 6 is a diagram to which reference will be made in explaining a structure of a CSR architecture address space. High-order 16 bits represent a node ID indicative of a node on each IEEE 1394, and remaining 48 bits are used to designate an address space given to each node. The high-order 16 bits are separated into 10 bits of a bus ID and 6 bits of a physical ID (node ID in a narrow sense). Values in which all bits go to 1 are for use as a special purpose, and hence 1023 buses and 63 nodes can be designated.

A space prescribed by high-order 20 bits of 256-terabyte address space prescribed by low-order 48 bits is separated into an initial register space for use as a register unique to 2048-byte CSR, a register unique to the IEEE 1394, or the like, a private space and an initial memory space. A space prescribed by low-order 28 bits are for use as a configuration ROM (configuration read only memory), an initial unit space for use unique to a node and plug control register (PCRs) if a space prescribed by its high-order 20 bits is the initial register space.

FIG. 7 is a diagram to which reference will be made in explaining offset addresses, names and operation of major CSRs. The offset in FIG. 7 indicates an offset address from FFFFF0000000h (numerals with h represent a hexadecimal notation) from which the initial resister space begins. A bandwidth available register (Bandwidth Available Register) having an offset 220$h$ represents a band which can be allocated to the isochronous communication, and only a value of node which is being operated as an isochronous resource manager is made effective. Specifically, although each node includes the CSR shown in FIG. 6, only the bandwidth available register of the isochronous resource manager is made effective. In other words, only the isochronous resource manager includes the bandwidth available register substantially. The bandwidth available register preserves a maximum value when the band is not allocated to the isochronous communication and its value decreases each time the band is allocated to the isochronous communication.

A channel available register of offsets 224$h$ to 228$h$ has bits respectively corresponding to channel numbers from channel 0 to channel 63. If the bit is 0, then this shows that the corresponding channel is already allocated. Only the channel available register of the node which is being operated as the isochronous resource manager is effective.

Referring back to FIG. 6, a configuration ROM based on a general ROM (read only memory) format is located at addresses 200$h$ to 400$h$ within the initial register space. Bus info block, root directory and unit directory are located at the configuration ROM. An ID number indicative of vender of devices is stored in a company ID within the bus info block. A unique ID unique to the device is stored in a chip ID.

In order to control input and output of the device through the interface, the node includes a PCR (Plug Control Register), prescribed by the IEC 1833, at addresses 900h to 9FFh within the initial unit space shown in FIG. 6. This is a substantiation of a concept of a plug in order to form a signal channel similar to an analog interface from a logical standpoint. FIG. 8 is a diagram to which reference will be made in explaining the arrangement of the PCR. The PCR includes an oPCR (output Plug Control Register) expressing an output plug and an iPCR (input Plug Control Register) expressing an input plug. The PCR also includes registers oMPR (output Master Plug Register) and iMPR (input Master Plug Register) indicating information of the output plug or the input plug proper to each device. Each device cannot include a plurality of oMPRs and iMPRs but can include a plurality of oPCRs and iPCRs corresponding to individual plugs depending upon a device capability. The PCR shown in FIG. 8 includes 31 oPCRs and iPCRs. The flow of isochronous data can be controlled by operating registers corresponding to these plugs.

FIG. 9 is a diagram showing arrangements of the oMPR, the oPCR, the iMPR and the iPCR. FIG. 9A shows the arrangement of the oMPR, FIG. 9B shows the arrangement of the oPCR, FIG. 9C shows the arrangement of the iMPR and FIG. 9D shows the arrangement of the iPCR, respectively. A code indicative of a maximum transfer speed of isochronous data that the device can transmit or receive is stored in the 2-bit data rate capability on the MSB side of the oMPR and the iMPR. A broadcast channel base of the oMPR prescribes the channel number for use with the broadcast output.

The number of the output plugs of the device, i.e., the value indicative of the number of the oPCRs is stored in the number of the output plugs of 5 bits on the LSB side of the oMPR. The number of the input plugs of the device, i.e., the value indicative of the number of the iPCRs is stored in the number of the input plugs of 5 bits on the LSB side of the iMPR. A main extended field and an auxiliary extended field are the areas defined for future extension.

An on-line on the MSB of the oPCR and the iPCR shows the state in which the plug is in use. Specifically, if its value is 1, then it is indicated that the plug is on-line. If its value is 0, then it is indicated that the plug is off-line. A value of the broadcast connection counter of the oPCR and the iPCR expresses whether the broadcast connection exists (1) or not (0). A value that a point-to-point connection counter having a 6-bit width of the oPCR and the iPCR expresses the number of point-to-point connection of the plug. The point-to-point connection (so-called p-to-p connection) is a connection used to transmit data among one specified node and another specified node.

A value of a channel number having a 6-bit width of the oPCR and the iPCR expresses the isochronous channel number to which the plug is connected. A value of a data rate having a 2-bit width of the oPCR expresses a real transmission speed of packets of the isochronous data outputted from the plug. A code stored in an overhead ID having a 4-bit width of the oPCR expresses a band width of the overhead of the isochronous communication. A value of a payload having a 10-bit width of the oPCR expresses a maximum value of data contained in the isochronous packets that the plug can handle.

Figure 10:
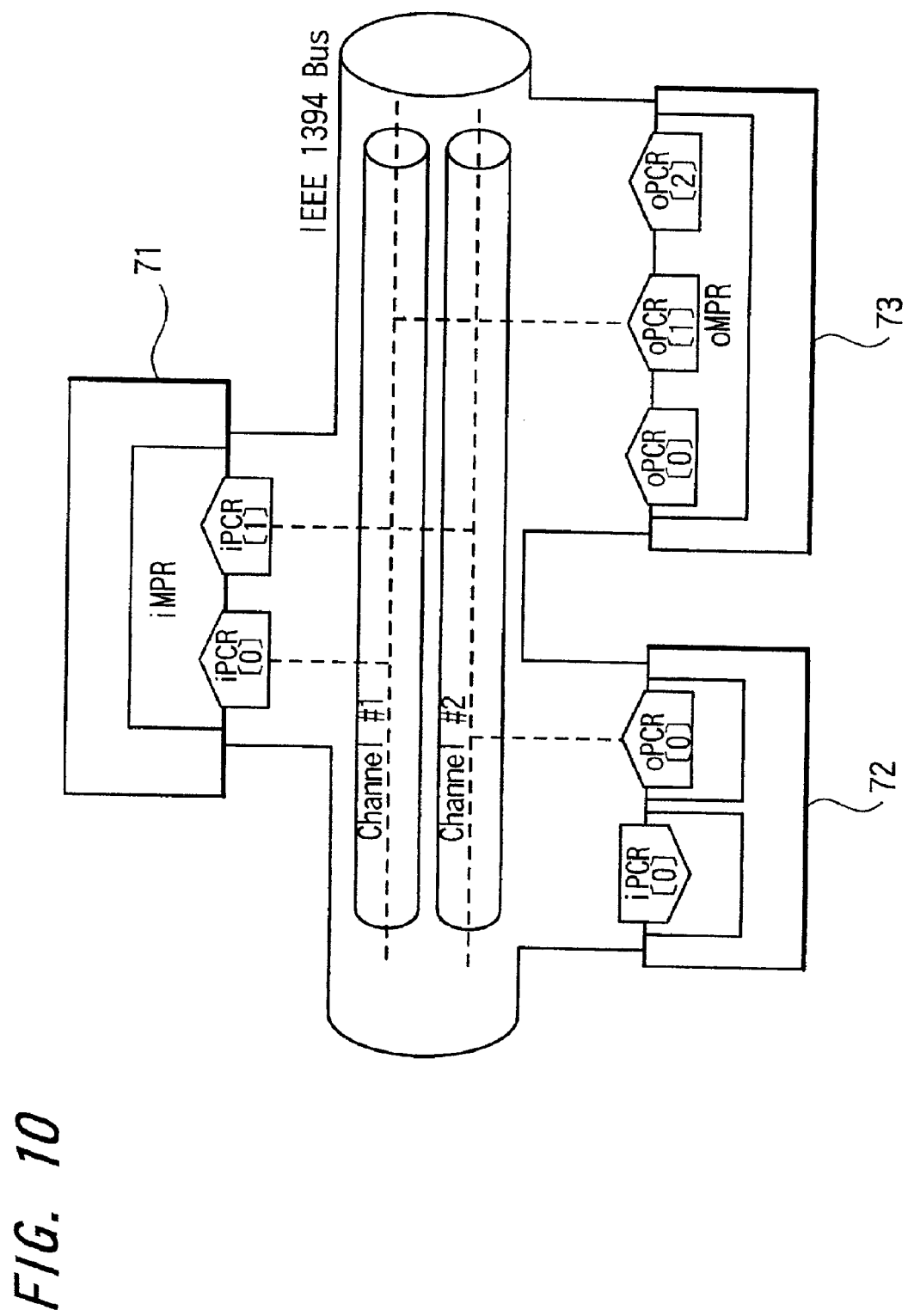
FIG. 10 is an explanatory diagram showing an example of a relationship among plugs, plug control registers and transmission channels.

FIG. 10 is a diagram showing a relationship among the plug, the plug control register and the isochronous channel. Devices connected to the IEEE 1394 system bus are shown as AV devices 71 to 73. Isochronous data whose channel was designated by the oPCR [1] of the oPCR [0] to the oPCR [2] in which the transmission speed and the number of the oPCRs are prescribed by the oMPR of the AV device 73 is transmitted to the channel #1 of the IEEE 1394 serial bus. Based on the transmission speed of the inputted channel #1 and the iPCR [0] of the iPCR [0] and the iPCR [1] in which the transmission speed and the number of the iPCRs are prescribed by the iMPR of the AV device 71, the AV device 71 reads the isochronous data transmitted to the channel #1 of the IEEE 1394 serial bus. In a like manner, the AV device 72 transmits isochronous data to the channel #2 designated by the oPCR [0], and the AV device 71 reads the isochronous data from the channel #2 designated by the iPCR [1].

In this manner, data is transmitted among the devices connected by the IEEE 1394 serial bus. The system according to this embodiment can control respective devices and judge the states by using the AV/C command set prescribed as commands for controlling the devices connected through the IEEE 1394 serial bus. The AV/C command set will be described next.

Figure 11:
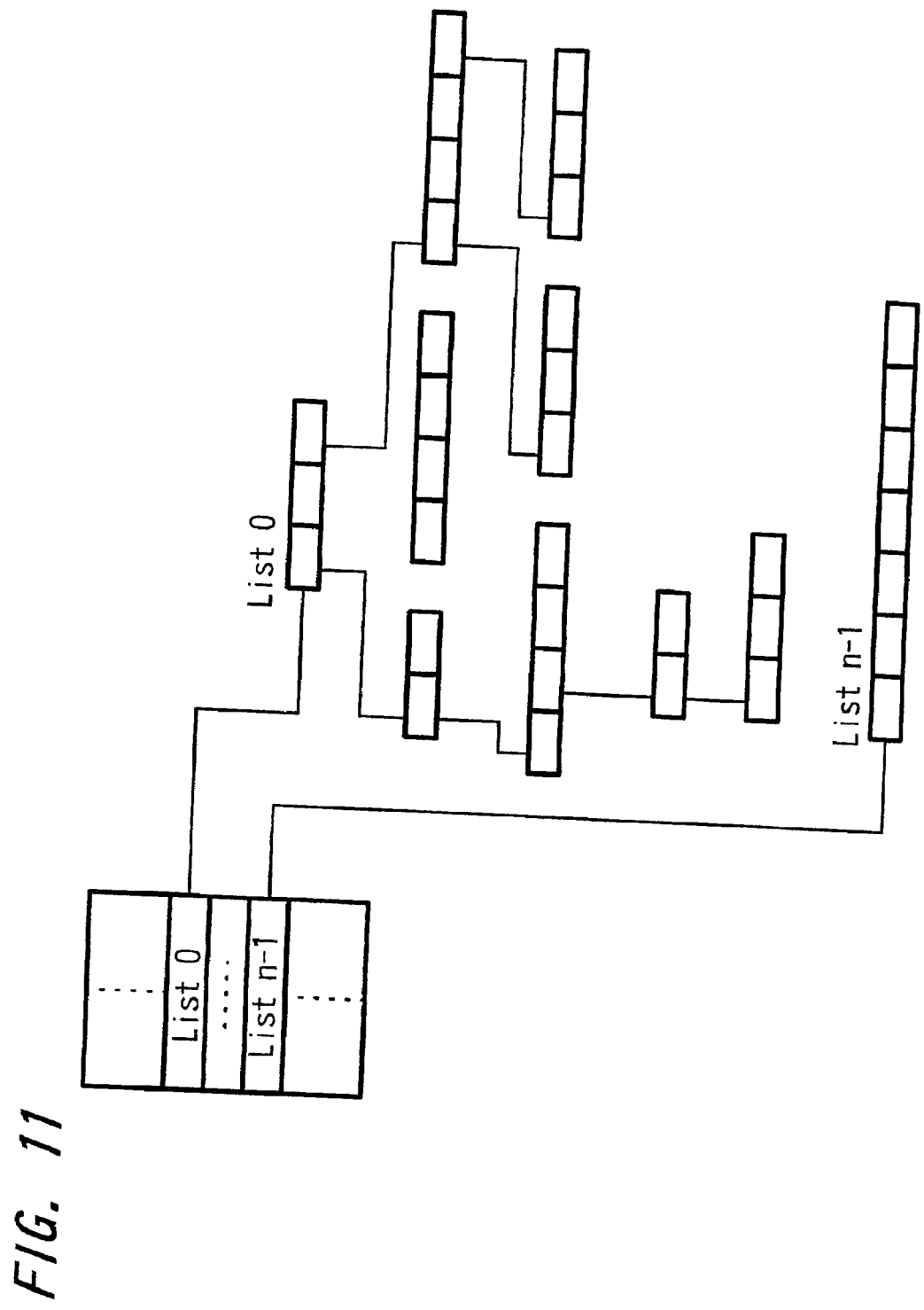
FIG. 11 is an explanatory diagram showing an example of a data structure based on a hierarchical structure of a descriptor.

First, a data structure of a subunit identifier descriptor in the AV/C command set used by the system according to this embodiment will be described with reference to FIGS. 11 to 14. FIG. 11 shows the data structure of the subunit identifier descriptor. As shown in FIG. 11, data is formed by lists of a hierarchical structure of the subunit identifier descriptor. A list expresses a receivable channel if it is a tuner and expresses a recorded number if it is a disc. The list at the uppermost position of the hierarchical structure is called a root list, and a list 0 becomes a root for low-order lists. Other lists also become root lists. There exist root lists as many as the objects. The object expresses each channel in the digital broadcasting or the like if the AV device connected to the bus is the tuner. All lists in one hierarchy share common information.

FIG. 12 shows a format of the general subunit descriptor. The subunit descriptor describes therein attribute information concerning functions as contents. A descriptor length field does not contain a value of its own field. A generation ID indicates a version of the AV/C command set, and its value is "00h" (h expresses the hexadecimal notation), for example. "00h" means that the data structure and the command are based on the version 3.0 of the AV/C general specification as shown in FIG. 13, for example. As shown in FIG. 13, all values excepting "00h" are reserved for future specification.

A size of list ID expresses the number of bytes of the list ID. A size of object ID expresses the number of bytes of the object ID. A size of object position expresses the position (number of bytes) in the list which is looked up upon control. The number of root object list expresses the number of the root object lists. A root object list ID shows an ID used to identify the highest-order root object list in the respective independent hierarchies.

A subunit dependent length expresses the number of bytes of a following subunit dependent data field (subunit dependent information) field. The subunit dependent data field is the field indicating function dependent information. A manufacturer dependent data length (manufacturer dependent length) indicates the number of bytes of a following manufacturer dependent data (manufacturer dependent information) field. Manufacturer dependent data is a field indicating specification information of a vender (manufacturer). When the descriptor does not contain the manufacturer dependent data, this field does not exist.

FIG. 14 shows a range in which the list ID shown in FIG. 12 is allocated. As shown in FIG. 14, "0000h" to "0FFFh" and "4000h" to "FFFFh" are reserved as allocation ranges for future specification. "1000h to 3FFFh" and "10000h to maximum value of list ID" are prepared in order to identify dependent information of function types.

Figure 15:
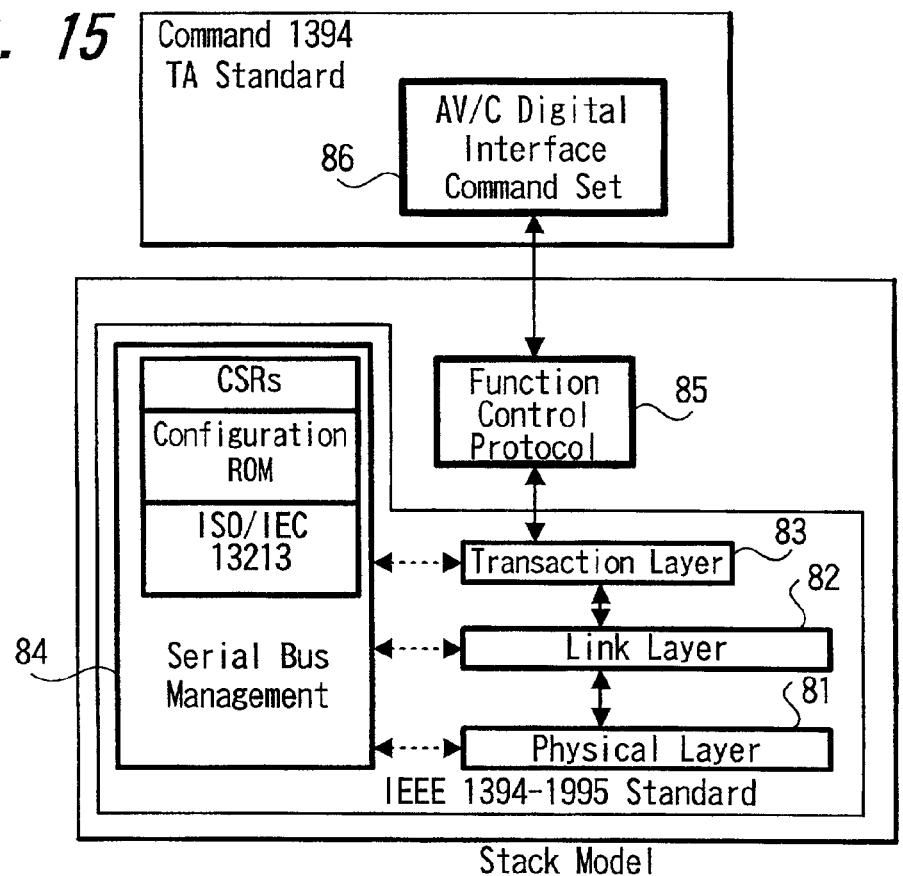
FIG. 15 is an explanatory diagram showing an example of a stack model of an AV/C command.

Next, the AV/C command set used in the system according to this embodiment will be described with reference to FIGS. 15 to 20. FIG. 15 shows a stack model of the AV/C command set. As shown in FIG. 15, a physical layer 81, a link layer 82, a transaction layer 83 and a serial bus management 84 are based on the IEEE 1394. An FCP (Function Control Protocol) 85 is based on the IEC 61883. An AV/C command set 86 is based on the 1394 TA specification.

Figure 16:
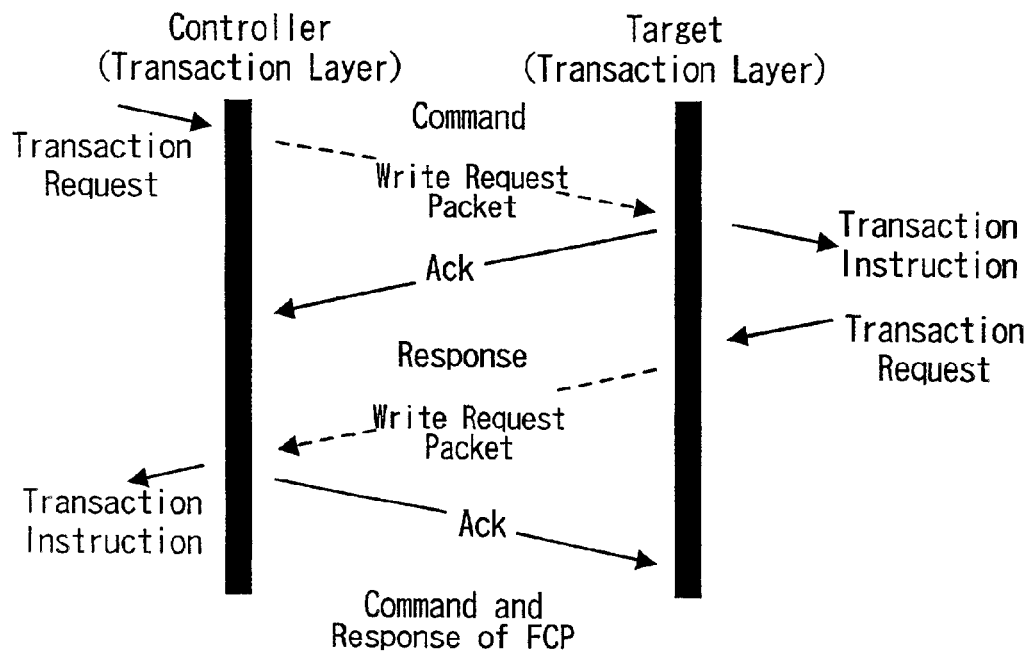
FIG. 16 is an explanatory diagram showing an example of a relationship between commands and responses of the AV/C command.

FIG. 16 is a diagram used to explain commands and responses of the FCP 85 shown in FIG. 15. The FCP is the protocol used to control devices (nodes) on the IEEE 1394 system bus. As shown in FIG. 16, a control side assumes a controller and a controller side assumes a target. The transmission or the response of the command in the FCP is executed between the nodes by using a write transaction of the asynchronous communication of the IEEE 1394 asynchronous communication. The target which received data returns acknowledge to the controller in order to confirm the reception.

Figure 17:
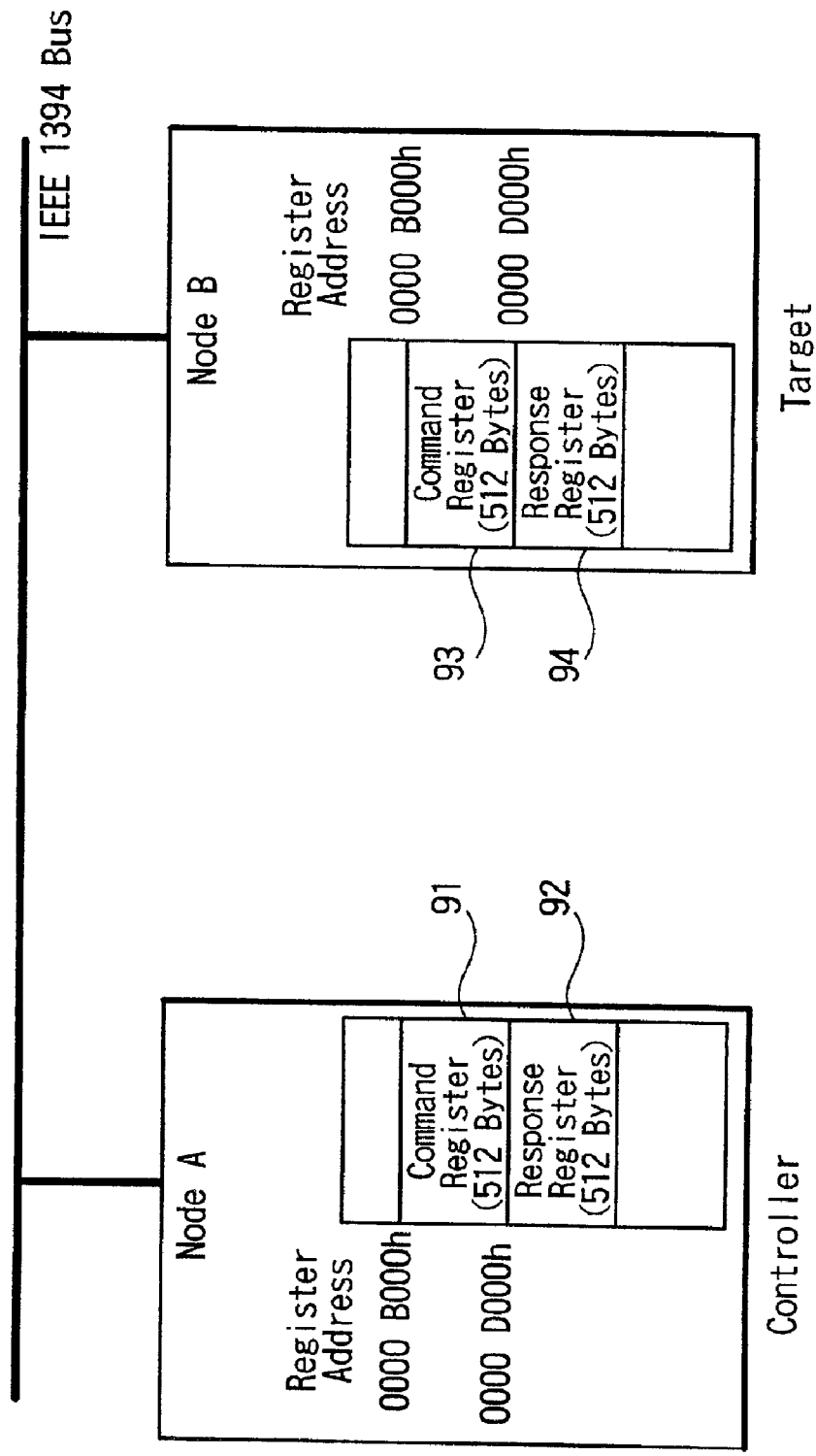
FIG. 17 is an explanatory diagram showing an example of a relationship between commands and responses of the AV/C command more in detail.

FIG. 17 is a diagram to which reference will be made in explaining the relationship between the command and the response in the FCP shown in FIG. 16 more in detail. Nodes A and B are connected together via the IEEE 1394 bus. The node A is the controller and the node B is the target. Both of the nodes A and B include 512-byte command register and response register. As shown in FIG. 17, the controller transmits a command by writing a command message in a command register 93 of the target. Conversely, the target transmits a response by writing a response message in a response register 92 of the controller. Control information is transmitted and received for the above two messages. The types of the command set transmitted by the FCP are written in a CTS in the data field of FIG. 18 which will be described later on.

Figure 18:
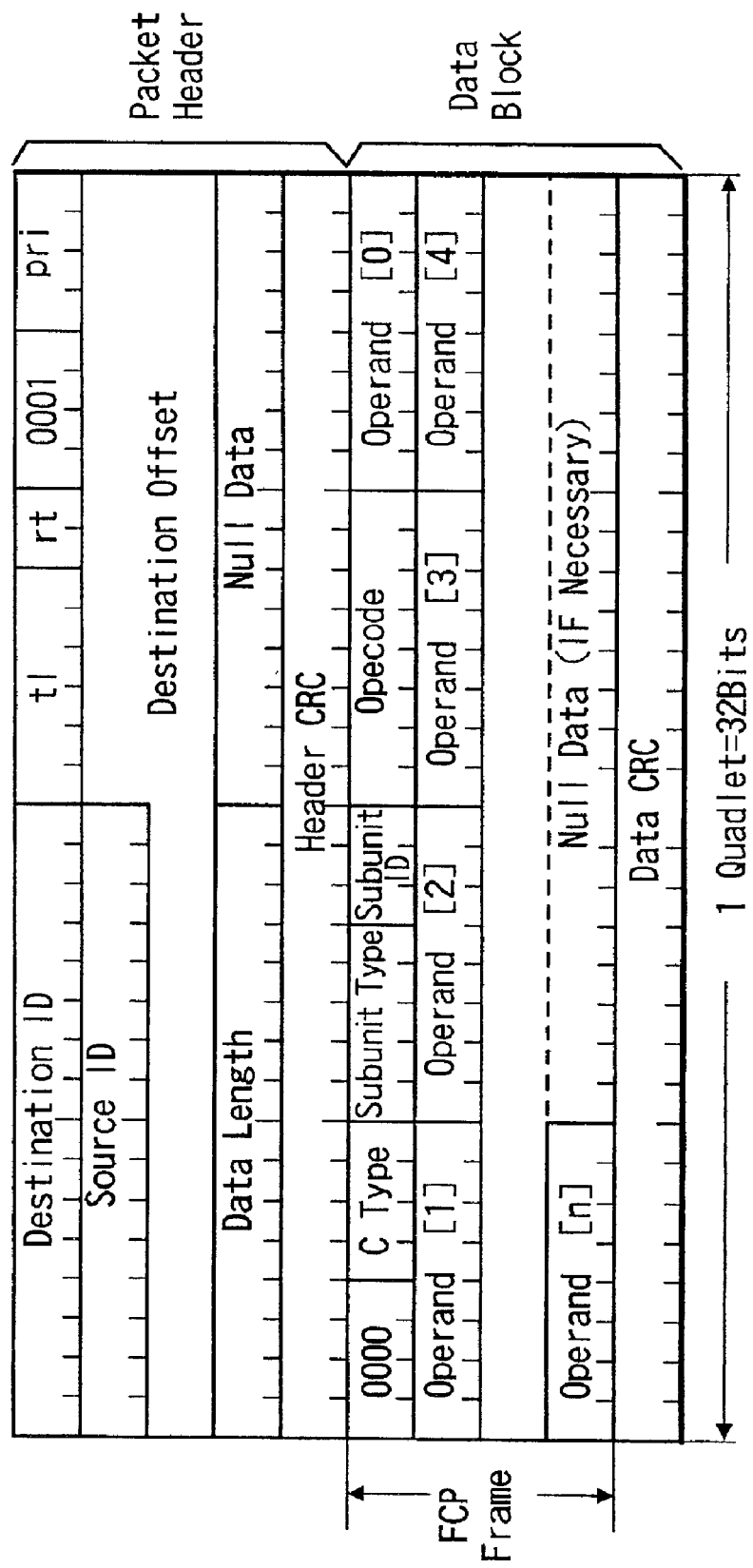
FIG. 18 is an explanatory diagram showing an example of a data structure of an AV/C command.

FIG. 18 shows a data structure of packets transmitted in the asynchronous transfer mode of the AV/C command. The AV/C command set is the command set used to control the AV devices, and CTS (command set ID)="0000". An AV/C command frame and a response frame are transmitted and received between the nodes by using the above FCP. In order to prevent a load from being imposed upon the bus and the AV devices, the response for the command should be transmitted within 100 ms. As shown in FIG. 18, data of asynchronous packet is comprised of 32 bits (=1 quadlet) in the horizontal direction. In the figure, the upper stage shows a packet header portion and the lower stage in the figure shows a data block. A destination destination ID) shows a destination.

The CTS shows a command set ID and CTS="0000" in the AV/C command set. A C type/response field shows a command function type when the packet is the command, and shows a processed result of command when the packet is the response. Roughly classified, there are four types of commands wherein (1) a command CONTROL for controlling the functions from the outside, (2) a command STATUS for inquiring the status from the outside, (3) a command for inquiring the existence of the support of the control command from the outside GENERAL INQUIRY (existence of support of opcode) and SPECIFIC INQUIRY (existence of support of opcode and operands) and (4) a command NOTIFY for notifying the change of the status to the outside.

Response messages are returned in response to the type of the command. Response messages for CONTROL command are NOT IMPLEMENTED, ACCEPTED, REJECTED and INTERIM. Response messages for STATUS command are NOT IMPLEMENTED, REJECTED, IN TRANSITION and STABLE. Response messages for the command GENERAL INQUIRY and SPECIFIC INQUIRY for inquiring the existence of the support of the command from the outside are IMPLEMENTED and NOT IMPLEMENTED. Response messages for the command NOTIFY for notifying the change of the status to the outside are NOT IMPLEMENTED, REJECTED, INTERIM and CHANGED.

The subunit type is provided in order to specify functions within the device, and tape recorder/player, tuner and so on are allocated to the subunit type. In addition to the functions corresponding to the devices, the subunit type is also allocated to the BBS (bulletin board subunit) which opens information to other devices. In order to discriminate a plurality of subunits of the same type, the addressing is executed by using the subunit ID (subunit ID) as a discrimination number. An opcode expresses a command, and an operand expresses a parameter of a command. There are prepared fields (additional operands) which should be added if necessary. Null data and the like are added to the operand if necessary. A data CRC (Cyclic Reduncy Check) is used to check errors when data is transmitted.

FIG. 19 shows examples of the AV/C command in concrete. The left-hand side in FIG. 19 shows examples of the c type/response messages in concrete. In the figure, the upper stage expresses command messages, and the lower stage in the figure expresses response messages. CONTROL is allocated to "0000", STATUS is allocated to "0001", SPECIFIC INQUIRY is allocated to "0010", NOTIFY is allocated to "0011", and GENERAL INQUIRY is allocated to "0100", "0101 to 0111" are reserved for future specification. NOT IMPLEMENTED is allocated to "1000", ACCEPTED is allocated to "1001", REJECTED is allocated to "1010", IN TRANSITION is allocated to "1011", IMPLEMENTED/STABLE is allocated to "1100", CHANGED is allocated to "1101" and INTERIM is allocated to "1111", "1110" is reserved for future specification.

The center portion in FIG. 19 shows examples of subunit types in " " concrete. A video monitor is allocated to "00000", a disc recorder/player is allocated to "00011", a tape recorder/player is allocated to "00100", a tuner is allocated to "00101", a video camera is allocated to "00111", a BBS is allocated to "01010, a vender unique subunit type (Vender unique) is allocated to "11100" and a specific subunit type (subunit type extended to next byte) is allocated to "111110". While a unit is allocated to "11111", this is used when it is transmitted to the device itself and might be the on/off of the power supply, for example.

The right-hand side of FIG. 19 shows examples of opecode operation code: opcode) in concrete. A table of opecodes exists at every subunit type. The right-hand side shows opecodes obtained when the subunit type is the tape recorder/player. Operands are defined for every opcode. A vender dependent value is allocated to "00h", a search mode is allocated to "50h", a time code is allocated to "51h", an ATN is allocated to "52h", an open memory is allocated to 60h", a memory read is allocated to "61h", a memory write is allocated to "62h", a load is allocated to "C1h", a recording is allocated to "C2h", a reproduction is allocated to "C3h" and a rewinding is allocated to "C4h".

FIG. 20 shows examples of the AV/C command and response in concrete. For example, when a user instructs a playback to a reproducing device serving as a target (consumer), the controller transmits the command shown in FIG. 20A to the target. Since this command uses the AV/C command set, CTS="0000". Since the ctype uses the command CONTROL for controlling the device from the outside, c type="0000" (see FIG. 19). Since the subunit type is the tape recorder/player, the subunit type="00100" (see FIG. 19). Identification code id shows the case of ID0 and hence id=000. The opcode is allocated to "C3h" which means the reproduction (see FIG. 19). The operand is allocated to "75h" which means the forward direction (FORWARD). When data is reproduced, the target transmits the response message shown in FIG. 20B to the controller. Since the response message "ACCEPTED" enters the response message, response "1001" (see FIG. 19). Portions other than the response are the same as those of FIG. 20A and therefore need not be described.

Next, the arrangement of the BBS (bulletin board subunit) which is the subunit for opening information to other devices prepared in the above AV/C command set and processing using such BBS will be described with reference to FIG. 21 and the following sheets of drawings.

Figure 21:
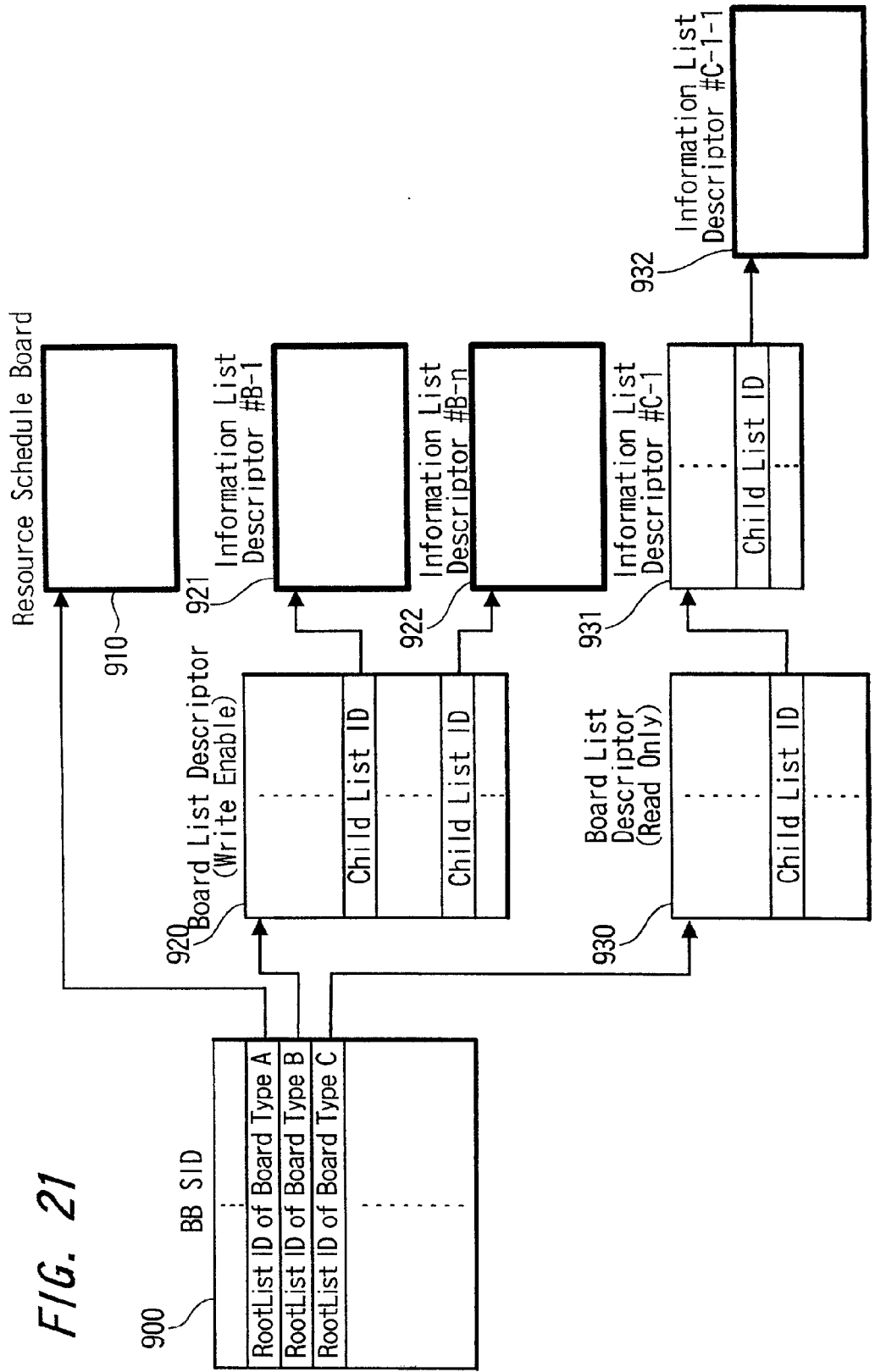
FIG. 21 is an explanatory diagram showing an example of an arrangement of a BBS (bulletin board subunit).

In this embodiment, the BBS is comprised of descriptors having a hierarchical structure shown in FIG. 21, for example. Specifically, a BBSID (Bulletin Board Subunit Identifier Descriptor) 900 which shows a data structure of BBS is provided at the highest-order class. Descriptors and positions of boards in actual practice are instructed by root list IDs shown by the BBSID 900. This BBSID is prescribed by [1394 Trade Association Board Subunit General Specification] which is the specification of bulletin board and presents lists which are indispensable for the subunits of the bulletin board. The controller should read this list when it accesses the BBS for the first time.

Board lists and information lists are disposed at the classes under the BBSID 900. For the board list and the information list, there are set two kinds of the read-only board list and information list and the write enable board list and information list, respectively. Specifically, as shown in FIG. 28 which shows a list of list types, a list type having a value 80 is set to a read-only board list, and a list type having a value 81 is set to a write enable board list. A list type having a value 82 is set to a read-only information list, and a list type having a value 83 is set to a write enable information list. The read-only list is such one in which information cannot be written by an instruction from a controller of an external device different from a device including a BBS and in which information can be written by an instruction from an internal controller of a device including a BBS.

Figure 22:
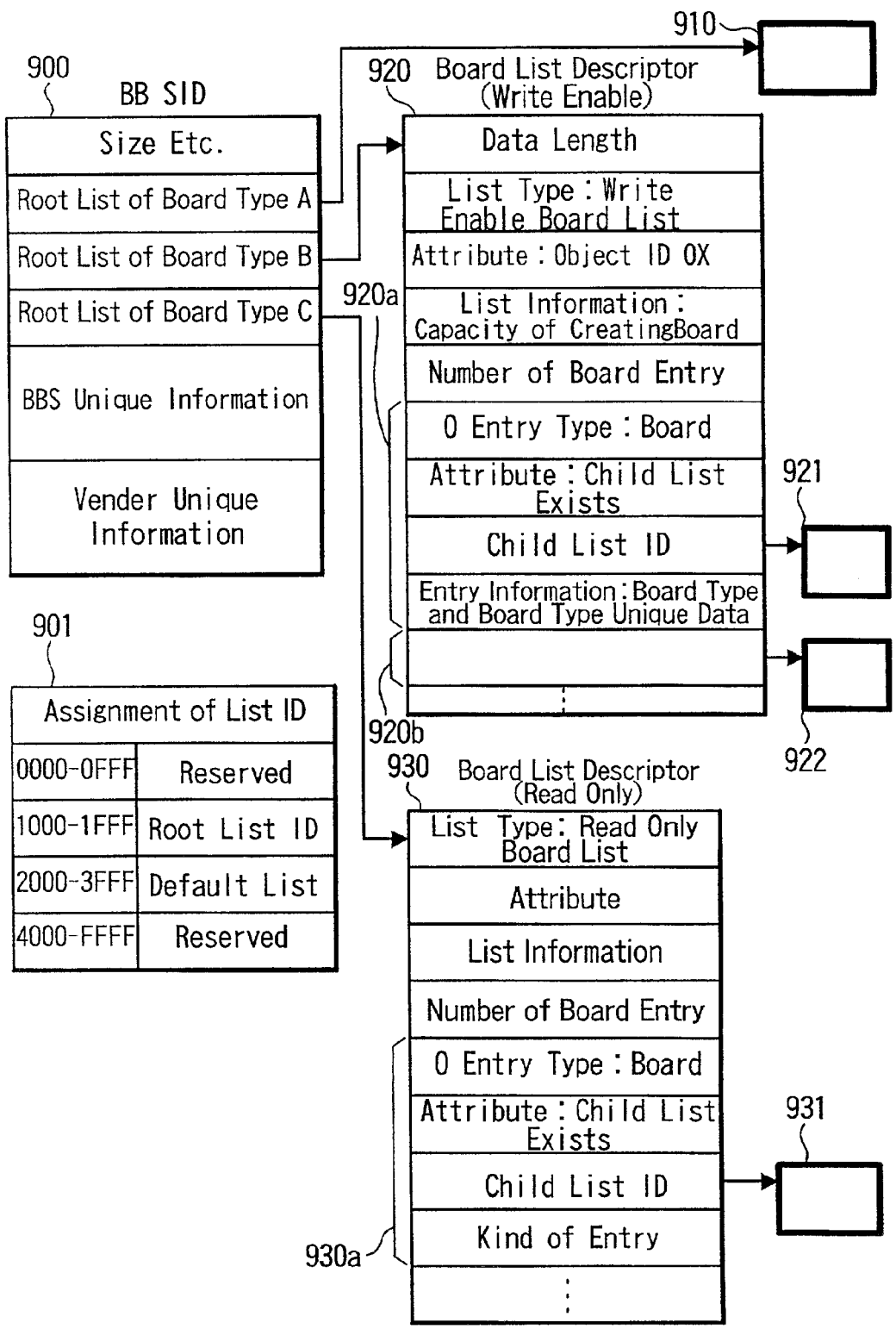
FIG. 22 is an explanatory diagram showing an example of a data structure of a part of the BBS shown in FIG. 21.

The BBSID 900 stores therein fundamental information used to read and write the lists provided within the BBS. To be concrete, as shown in FIG. 22, predetermined information such as size are provided in the first list of the BBSID 900. Further, these information are followed by root list IDs. These root list IDs are served as pointers to the board lists directly connected to the respective BBSs. One value is assigned to each of these root list IDs at every board type.

Specifically, as shown by a list ID assignment 901 shown in FIG. 22, for example, this root list ID is defined by values ranging from 0000 to FFFF in a hexadecimal notation. Of these values, values from 1000 to 1FFF are used to define the root list ID. Values ranging from 2000 to 3FFF of the root list ID are used as a free space for a default list. Further, values ranging from 0000 to 1FFF of the root list ID and values ranging from 4FFF to FFFF are reserved. The values of these root list IDs are opened by the specification and the like.

In the above BBSID 900, there are provided a plurality of root list IDs depending upon board types. In the example of FIG. 22, there are provided three kinds of BBS of types A to C. Further, these root list IDs are followed by BBS unique information, vender unique information and the like.

The root list ID of the type A becomes a pointer to a resource schedule board (RSB) 910. Information concerning the concrete setting of a timer-activated recording (channel, start time, etc.) are written in this resource schedule board 910. Object IDs are individually set to the information written in the resource schedule board 910 and information of the object IDs are written in the resource schedule board 910. This object ID is commonly used so long as it is information concerning the same timer-activated recording. Specifically, in the case of this embodiment, although only fundamental information concerning the timer-activated recording is written in the resource schedule board 910 and information accompanying with each timer-activated recording is written in information list descriptors 921, 922, 931, 932 which will be described later on, fundamental information and information accompanying with each timer-activated recording are associated with each other by setting the same object IDs as the object IDs of respective items within the resource schedule board 910 to respective items within the information list descriptor.

Board list descriptors 920, 930 shown in FIG. 22 are retrieved by the root list IDs of the types B, C of the BBSID 900.

The board list descriptor 920 shows a write enable board list descriptor. The write enable board list descriptor shows that information can be written therein from another device connected via the bus line 1. It is needless to say that information can be written in this write enable board list descriptor by its own controller. The board list descriptor 920 shows a data length of list first and then shows that the list type is the write enable board list. Further, this board list descriptor shows the attributes of whether or not it has an object ID and a capacity of board that can be formed as list information. Furthermore, this board list descriptor shows the number of prepared board entries.

The board list descriptor is followed by information concerning respective boards. Specifically, assuming that the number of the board entries is n, for example, then there exist board entries from 0 entry type to n-1 entry type. As 0 entry type information 920a, it is indicated that the entry type is the board and it is determined whether or not the board has a child list as an attribute. If the board has the child list, then there is provided a child list ID. This child list ID instructs the position of a descriptor (#B-1) 921 serving as a child list. As entry information, there are provided a board type and a field in which information concerning the details of the board type are written. Further, there are provided such lists as many as the boards. For example, there is similarly provided information 920b of 1 entry type, and the position of descriptor (#B-n) 922 is instructed by a child list ID of such information.

The board list descriptor 930 shown in FIG. 22 shows a read only board list descriptor. In this case, first, the list type shows that the board is the read only board. The read only board shows the board in which information cannot be written by another device connected through the bus line 1. Information can be written in the read only board by its own controller. Further, the attribute shows whether or not this board list descriptor has an object ID, a capacity of a board that can be formed as list information and the number of board entries.

These are followed by information concerning respective boards. Specifically, 0 entry type information 930a, for example, shows that the entry type is the board and whether or not the attribute has a child list. If the attribute has the child list, then there is provided a child list ID. The position of a descriptor 931 serving as the child list is instructed by this child list ID. Moreover, as the entry information, there are provided a board type and a field in which information concerning details of the board type is written. Further, there are provided lists as many as the number of boards.

Figure 23:
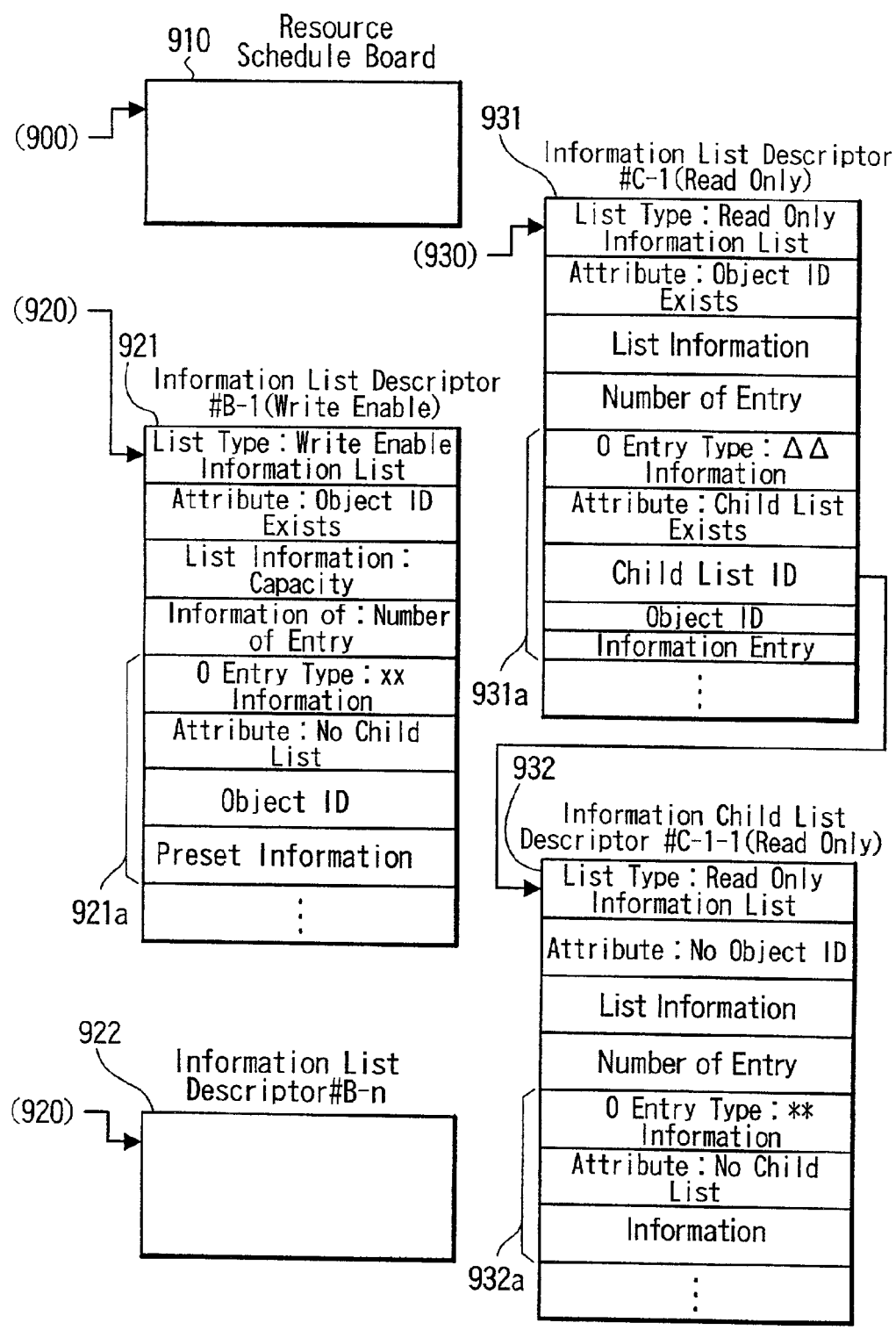
FIG. 23 is an explanatory diagram showing other example of a data structure of a part of the BBS shown in FIG. 21.

In an information list descriptor (#B-1) 921 shown in FIG. 23, first, the list type shows that this list is a write enable information list, for example. Further, the attribute shows whether or not this information list descriptor has an object ID, a capacity that can be formed as a list specification and information of the number of entries.

These are followed by information concerning respective information. Specifically, 0 entry type information 921a shows that this information is preset information and whether or not this information has a child list as an attribute. If this information does not have a child list, then there is not provided a field of a child list ID. Then, there are provided an object ID and preset information, for example. Further, there are provided lists as many as the number of information. Another information list descriptor (#B-n) 922 of the same class has a similar data arrangement and need not be described in detail.

In an information list descriptor (#C-1) 931 which is a child list of the board list descriptor 930, the position is instructed by the child list ID of the board list descriptor 930. This information list descriptor #C-1 shows that this descriptor further includes a child list.

In the information list descriptor (#C-1) 931, first, a list type shows that information is read-only information. An attribute shows whether or not information includes an object ID and also shows list information, a capacity in which information can be formed as a list and the number of entries.

The above items are followed by information 931a concerning each information. Specifically, 0 entry type shows that information is Ac Ac information, and an attribute shows whether or not information includes a child list. If information includes the child list, then there are provided a child list ID, an object ID and an information entry. Further, there are provided lists as many as the number of information.

An information child list descriptor (#C-1-1) 932 which is located at the class under such descriptor is retrieved by the child list ID provided in this descriptor. In this descriptor (#C-1-1) 932, first, a list type shows that information is a read-only board and an attribute shows whether or not information includes an object ID.

Further, list information, a capacity in which information can be formed as a board and the number of entries are shown. As information concerning each information, e.g., as 0 entry type information 932a, the attribute shows whether or not information includes a child list. There is also provided an information entry specific. There are provided the above lists as many as the number of entries.

According to the bulletin board subunit thus arranged, since the ID of the root list ID is assigned to each board type as described above, the controller can read the root list ID from the BBSID and can confirm by comparing it with a target board type whether or not the target board type exists within a target subunit.

Each root list ID shows the starting list comprising the board or the board list comprised of a plurality of boards of the same type. The contents of the board and the board list are as follows. The board is comprised of more that one information list descriptor. The board list descriptor comprised of a plurality of boards of the same type shows a pointer of a starting information list descriptor of each board.

As the board list descriptor comprised of a plurality of board types, there are available two types of a write enable board list descriptor and a read-only board list descriptor. These types can be discriminated from each other by a list type. The controller can generate, according to the write enable board list, the boards of the same type in a remote control fashion. Having detected that the list type is of the write enable list type, the controller issues a write executing command to write data and can set necessary data within the descriptor.

Further, these data can be accessed by using an AV/C OPEN/READ/WHITE Descriptor command prescribed by the AV/C command, for example.

Specifically, when the descriptor within the BBS is accessed, first, a corresponding descriptor is set in a read or write state by transmitting an OPEN DESCRIPTIR command having an arrangement shown in FIG. 29. In this open descriptor command, as shown in FIG. 29, for example, values corresponding to the open descriptor commands are located to the opecode field, a value of the type of descriptor to be opened is located at the field of the operand [0], a value of list ID to be opened is located at the fields of the operands [1], [2] and a value of subfunction is located at the field of the operand [3]. When the descriptor is opened for writing, for example, a value of write open is located as subfunction. When the descriptor is opened for reading, a value of read open is located. Fields following the filed of the operand [4] are reserved.

When data is read out from the descriptor which can be set to the accessible state by the open descriptor command shown in FIG. 29, necessary data is read out from the descriptor by transmitting a read command. FIG. 30 shows an arrangement of this read command. The arrangement of this read command will be described. A value corresponding to the read descriptor command is located at the field of the opecode. At the fields following the field of the operand [0], there are located data for identifying a descriptor. Type of data to be read, data length and address and the like are located at specific operands.

When data is written in the descriptor which is set to the accessible state by the open descriptor command shown in FIG. 29, necessary data is written in the descriptor by transmitting a write command. FIG. 31 shows an arrangement of this write command. The arrangement of the write command will be described. A value corresponding to a write descriptor command is located at the field of the opecode, data for identifying descriptor is located at the field of the operand [0] and a subfunction, a group tag, a write data length, an address, an original data length obtained before data is rewritten and write data are allocated at the following operands. As the subfunction, there is provided a subfunction for instructing a partial rewriting.

When the access to the corresponding descriptor is ended after data has been read out from the descriptor by the read command shown in FIG. 30 or data has been written in the descriptor by the write command shown in FIG. 31, the access to the corresponding descriptor is ended by transmitting a close command. The close command can instruct the close by a subfunction using a command having an arrangement similar to that of the open command. Specifically, as shown in FIG. 32, a value corresponding to an open descriptor command is located at the field of the opecode, a value of a descriptor type to be opened is located at the field of the operand [0], a value of a list ID to be opened is located at the fields of the operands [1], [2], and a value of a subfunction indicating the close is located at the field of the operand [3]. Fields following the field of the operand [4] are reserved.

Next, the manner in which the board shown by the BBSID of FIG. 21 is read out from the controller of another device on the bus line by using the AV/C command will be described with reference to flowcharts of FIGS. 24 to 27.

Figure 24:
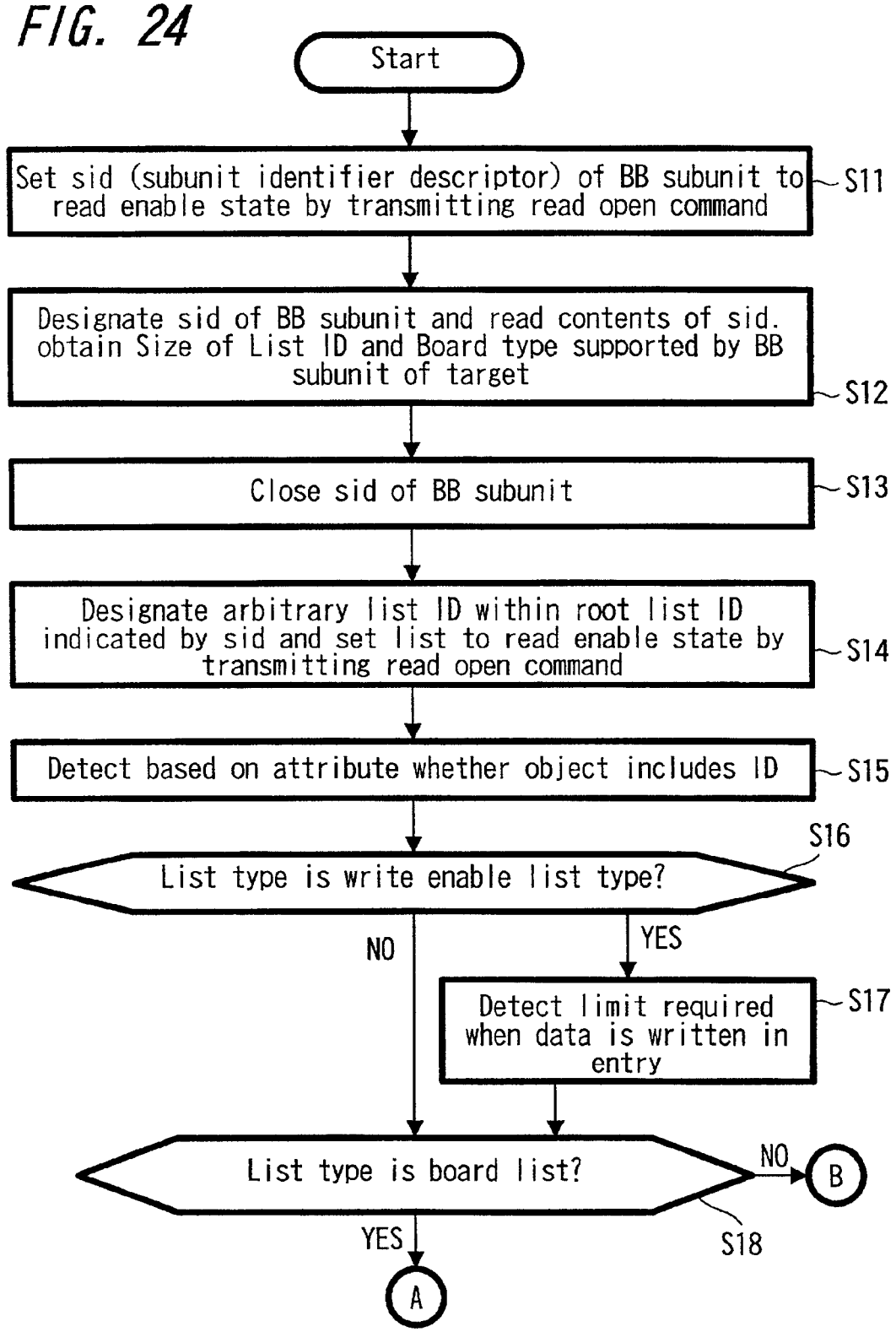
FIG. 24 is a flowchart showing an example of processing executed when a board shown by the BBS is read out.

Referring initially to the flowchart of FIG. 24, the SID subunit identifier descriptor) of the BB subunit (bulletin board subunit) is set to the read enable state by transmitting the read open command (step S11). In this state, the SID of the BB subunit is designated and the contents of the SID are read out by the read descriptor command. Then, the size of the list ID and the board type supported by the BB subunit of the target are obtained (step S12). Thereafter, the SID of the BB subunit is closed (step S13).

Next, an arbitrary list ID is designated from the root list ID shown by the SID and the list is set to the read enable state by transmitting the read open command (step S14). It is determined based on the attribute data whether or not the object within the list has an ID (step S15). Further, it is determined whether the list type is of the write enable list type or not (step S16). If the list type is of the write enable list type, then a limit required when the entry is written is detected (step S17). If it is determined at the step S16 that the list type is not the write enable list type, then the limit required when the entry is written is detected at the step S17 and then it is determined whether or not the list type is of the board list type (step S18).

Figure 25:
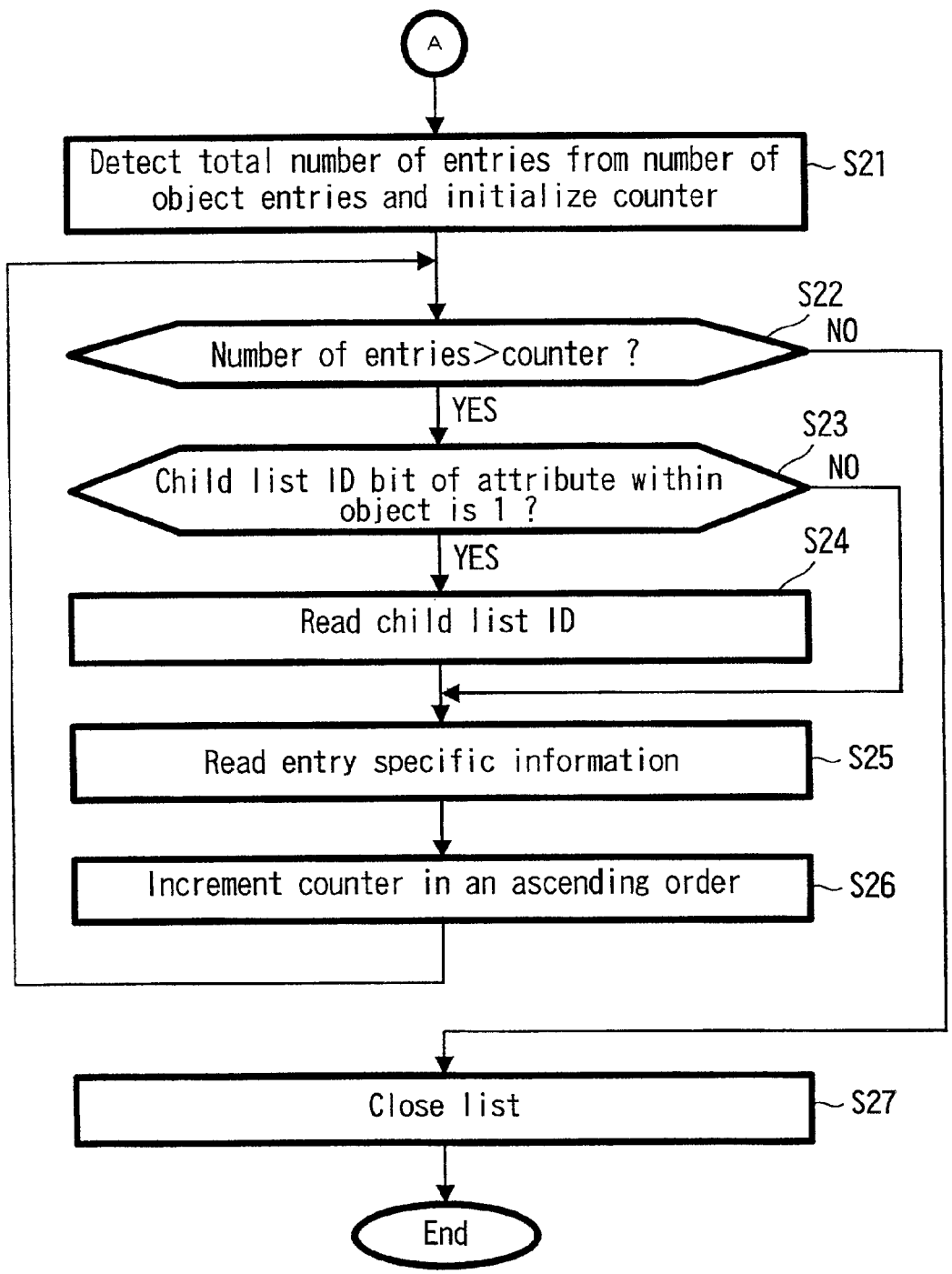
FIG. 25 is a flowchart showing an example of processing executed when a board list entry is read out.

If it is determined at the step S18 that the list type is of the board list type, then control goes to the flowchart of FIG. 25 which is processing for reading out a board list entry. In this processing, the total number of entries within the corresponding descriptor is detected from data indicative of the number of the object entries of the corresponding board list entry, and a counter set within the controller is initialized (step S21).

Then, it is determined whether or not the total number of entries is greater than the count value of the counter (step 522). In the initial state, the total number of the entries becomes greater than the count value of the counter. If it is determined that the total number of the entries is greater than the count value of the counter, then it is determined whether or not the child list ID of the attribute within the object is 1 (i.e., whether or not the child list exists) (step S23). If it is determined that the child list ID is 1, then the child list ID is read out (step S24). If it is determined at the step S23 that there exists no child list, then after the child list ID has been read out at the step S24, information of the entry (entry specific information) is read out (step S25), the counter value is incremented in an ascending order (step S26) and control goes to the judgment at the step S22.

If it is determined at the step S22 that the total number of the entries is equal to the count value of the counter, then the reading is ended by transmitting a board list closing command (step S27).

Figure 26:
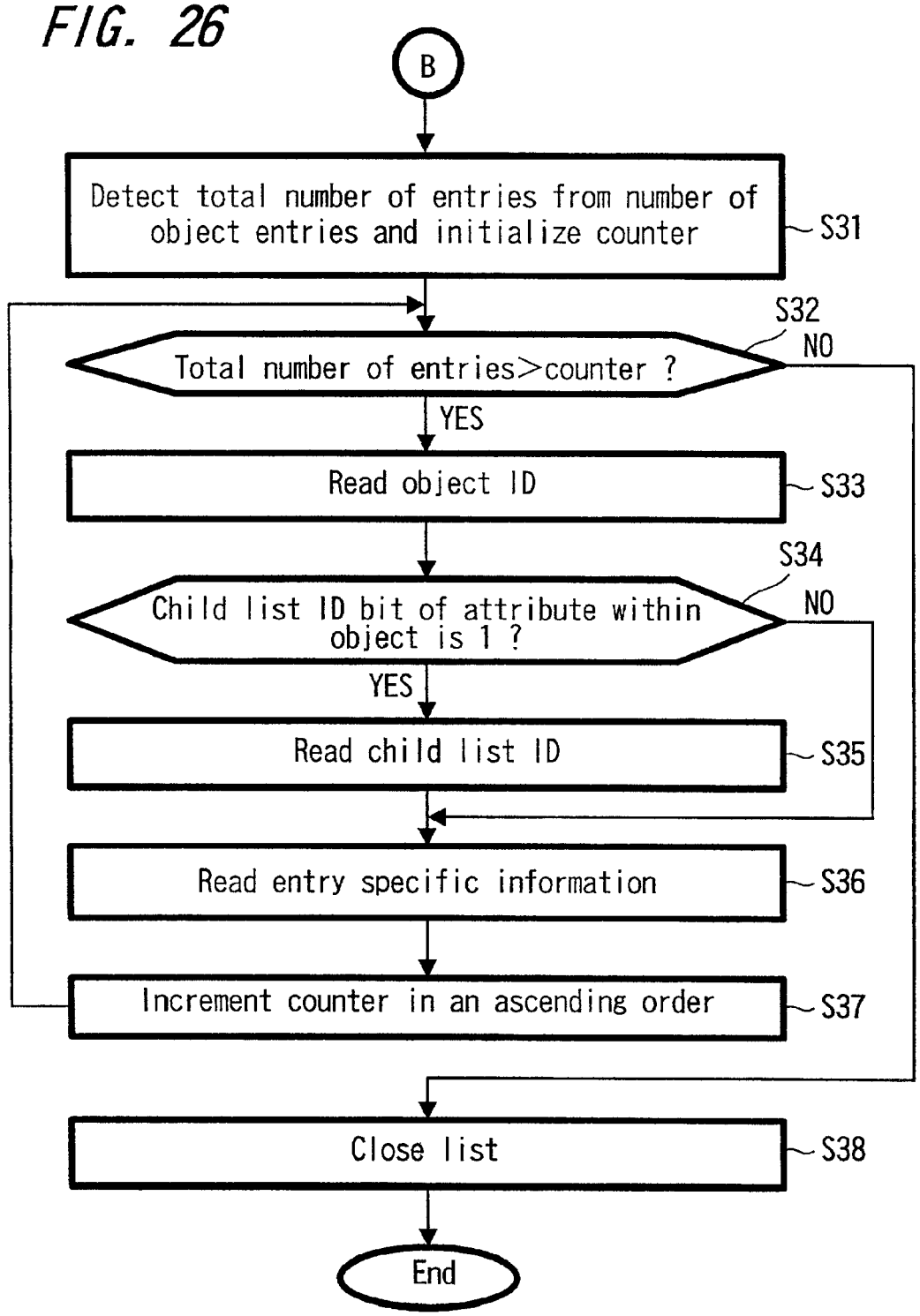
FIG. 26 is a flowchart showing an example of processing executed when an entry is read out from an information list.

If it is determined at the step S18 of the flowchart shown in FIG. 24 that the list type is not of the board list type (i.e., it is determined that the list type is of the information list type), control goes to a flowchart of FIG. 26 which is processing for reading an information list entry. The total number of the entries within the corresponding descriptor is detected from data indicative of the number of the object entries of the corresponding information list, and a counter set within the controller is initialized (step S31).

Then, it is determined whether or not the total number of the entries is greater than the count value of the counter (step S32). In the initial state, the total number of the entries becomes greater than the count value of the counter. If it is determined that the total number of the entries is greater than the count value of the counter, then an object ID is read out (step S33). Further, it is determined whether or not the child list ID of the attribute within the object is 1 (i.e., whether or not there exists the child list) (step S34). If it is determined that the child list ID is 1, then the child list ID is read out (step S35). If it is determined at the step S34 that there exists no child list, then after the child list ID has been read out at the step S35, information of the entry (entry specific information) is read out (step S36), the value of the counter is incremented in an ascending order (step S37), and control goes back to the judgment at the step S32.

If it is determined at the step S32 that the total number of the entries is equal to the count value of the counter, then the reading is ended by transmitting a command for closing this information list (step S38).

Next, the manner in which the information child list is read out when it is determined that the information list includes the child list will be described with reference to a flowchart of FIG. 27.

First, the child list ID read out from the information list at the step S35 is designated, and the information list is set to the read enable state by transmitting the read open command (step S41). In this state, it is determined whether or not the list type is of the write enable list type (step S42). If it is determined that the list type is of the write enable list type, then a limit required when data is written in the entry is detected (step S43). If it is determined at the step S42 that the list type is not of the write enable list type, then after the limit required when data is written in the entry has been detected at the step 43, it is detected based on the attribute whether the entry within the list includes an object ID (step S44). Then, the total number of the entries is judged from the number of the object entries, and the counter is initialized (step S45).

Then, it is determined whether or not the total number of the entries is greater than the count value of the counter (step S46). In the initial state, the total number of the entries becomes greater than the count value of the counter. If it is determined that the total number of the entries is greater, then it is determined whether or not the entry includes the object ID (step S47). If it is determined that the entry includes the object ID, then the object ID is read out from the entry (step S48). Further, it is determined whether or not the child list ID of the attribute within the object is 1 (i.e., whether or not the entry includes the child list) (step S49). If it is determined that the child list ID is 1, then the child list ID is read out (step S50). Then, entry information (entry specific information) is read out (step S51), the value of the counter is incremented in an ascending order (step S52), and control goes back to the judgment at the step S46.

If it is determined at the step S46 that the total number of the entries is equal to the count value of the counter, then the reading is ended by transmitting a command for closing this information list (step S53).

While the descriptor read processing has been described so far with reference to the flowcharts of FIGS. 24 to 27, data can be written in the write enable descriptor by issuing the write command while designating the position of the list by a procedure similar to that of the read processing.

Since the bulletin board subunit is prepared in one device connected via the bus line of the IEEE 1394 system, the descriptor making the subunit is formed in the hierarchical structure and each board and information can be judged from the highest-order descriptor, the devices connected via the bus line can efficiently share data written in the bulletin board subunit and control can be made.

As shown in FIG. 2, for example, if the bulletin board subunit (BBS) 4 is prepared on the DVCR 200 side, the BBS controller 5 within the IRD 100 connected to the DVCR 200 via the bus line 1 can read out the BBS 4 in the procedure according to the flowcharts of FIGS. 24 to 27 and can judge the situation in which the timer-activated recording is set in the DVCR 200. When the tuner within the IRD 100 needs the reception for the timer-activated recording, for example, corresponding operation is executed by reading this BBS 4.

Since fundamental information such as the start time of the timer-activated recording is directly written in the resource schedule board directly instructed by the root list ID within the BBSID which is the highest-order descriptor, the above information can be obtained rapidly.

Since information accompanying with the timer-activated recording, for example, is written in the information list descriptor, the details concerning the timer-activated recording can be known by reading out information from the respective information list descriptors. For example, the details such as a title and contents of a timer-activated recording program can be known. Information such as the title and the contents of the program can be obtained by using data called an EPG (electronic program guide) superimposed upon broadcasting data when the data is a digital broadcasting received by the IRD 100, for example. Since the object IDs are set to information set in the respective descriptors and the respective resource schedule boards, it becomes possible to easily understand a correspondence between the respective information.

A new timer-activated recording can be set by writing data in the BBS 4 under control of the controller 5 within the IRD 100. In this case, data is written in the write enable descriptor. In that case, when information of a capacity in which data can be written is read out from the descriptor and judged, a capacity in which data can be written can be judged, and hence the setting for writing can be executed properly.

Further, since the descriptor set within the BBS is limited in writing, if detailed information concerning the timer-activated recording set within the DVCR 200, for example, is prepared on the descriptor in which the writing was limited, then the timer-activated recording cannot be corrected by the controller 5 within the IRD 100, and hence the timer-activated recording can be protected accurately.

The present invention is not limited to the above embodiment and can be variously modified without departing from the gist of the present invention.

For example, while the BBS (bulletin board subunit) is used to write information concerning the timer-activated recording as set forth in the above embodiment, the present invention is not limited thereto and other data that should be opened through the bus line may be written in a descriptor having a similar hierarchical structure by the BBS. Devices using the BBS can be applied to electronic device other than the above IRD and DVCR (various video devices, audio devices, etc.).

Furthermore, while the bus line for connecting the devices is applied to the bus line of the IEEE 1394 system in the above embodiment, the present invention is not limited thereto and bus lines of other standards may be used. In this case, in addition to bus lines connected via cables, a radio transmission line for similarly transmitting data by a radio communication among a plurality of devices can be applied to the present invention.

What is claimed is:

1. An information processing method for transmitting information among a plurality of devices connected through a network, comprising the steps of:

setting an information opening data storage section for opening predetermined information to devices connected through said network;

forming said information opening data storage section as a descriptor format having a predetermined hierarchical structure;

storing said predetermined information in a board set in said descriptor format;

directly instructing the position at which said predetermined board is stored by a highest-order descriptor of said hierarchical structure; and storing information concerning said predetermined information in an information area instructed when said hierarchical structure is retrieved from said highest-order descriptor.

2. An information processing method according to claim 1, wherein said information area has an area in which information from other devices than devices in which descriptors are set can be written and an area in which the writing of information from other devices is limited.

3. An information processing method according to claim 2, wherein when said area in which information can be written is set, information concerning a capacity in which information can be written is added to a descriptor.

4. An information processing method according to claim 1, wherein information stored in a board and information stored in said information area are associated with each other by adding IDs to respective information stored in said predetermined board and by adding a common ID to respective information stored in said information area.

5. An information processing system for transmitting information among a plurality of devices connected through a network, in which a first device connected to said network includes an information opening data storage section for opening predetermined information to devices connected through said network and a control section for reading or writing data stored in said information opening data storage section by receiving predetermined commands through said network, and a second device connected to said network includes a control section for issuing commands for instructing the reading or the writing of data stored in said information opening data storage section, wherein data is stored in said information opening data storage section provided in said first device in the descriptor format having a predetermined hierarchical structure, said predetermined information is stored in aboard set in said descriptor format, the position at which said predetermined board is stored is directly instructed by a highest-order descriptor having said hierarchical structure, and information concerning said predetermined information is stored in an information area instructed when said hierarchical structure is retrieved from said highest-order descriptor.

6. An information processing system according to claim 5, wherein said information area within said information opening data storage section of said first device includes an area in which information from said second device can be written and an area in which the writing of information from said second device is limited.

7. An information processing system according to claim 6, wherein when an area in which information can be written is set as said information area, a storage area of information concerning a capacity in which information can be written is added to a descriptor, and the capacity in which information can be written is judged by the control section of said second device.

8. An information processing system according to claim 5, wherein IDs are added to respective information stored in a predetermined board within the information opening data storage section of said first device, a common ID is added to respective information stored in said information area, and the control section of said second device judges based on said ID a correspondence between information stored in said board and information stored in said information area.

9. An information processing apparatus for transmitting information to other devices connected through a network, comprising:

an information opening data storage section for opening predetermined information to other devices connected through said network; and a control section for reading or writing data stored in said information opening data storage section by receiving a predetermined command through said network, wherein data is stored in said information opening data storage section in the descriptor format having a predetermined hierarchical structure, said predetermined information is stored in a board set in said descriptor format, the position at which said predetermined board is stored is directly instructed by a highest-order descriptor having said hierarchical structure and information concerning said predetermined information is stored in an information area instructed when said hierarchical structure is retrieved from said highest-order descriptor.

10. An information processing apparatus according to claim 9, wherein the information area within said information opening data storage section includes an area in which information from other device can be written and an area in which the writing of information from other device is limited.

11. An information processing apparatus according to claim 10, wherein when the area in which information can be written is set as said information area, a storage area of information concerning a write enable capacity is added to a descriptor.

12. An information processing apparatus according to claim 9, wherein IDs are added to respective information stored in a predetermined board within said information opening data storage section and a common ID is added to respective information stored in said information area.

* * * * *